US008863091B2

(12) United States Patent
Dageville et al.

(10) Patent No.: US 8,863,091 B2
(45) Date of Patent: Oct. 14, 2014

(54) UNIFIED TRACING SERVICE

(75) Inventors: Benoit Dageville, Foster City, CA (US);
Amirali S. Valiani, San Jose, CA (US);
Hailing Yu, San Jose, CA (US); **Gary
Ngai**, Saratoga, CA (US)

(73) Assignee: Oracle International Corporation,
Redwood Shores, CA (US)

( * ) Notice: Subject to any disclaimer, the term of this patent is extended or adjusted under 35 U.S.C. 154(b) by 1467 days.

(21) Appl. No.: 12/189,080

(22) Filed: Aug. 8, 2008

(65) Prior Publication Data
US 2009/0106741 A1 Apr. 23, 2009

Related U.S. Application Data

(60) Provisional application No. 60/981,440, filed on Oct. 19, 2007.

(51) Int. Cl.
*G06F 9/44* (2006.01)
*G06F 11/36* (2006.01)

(52) U.S. Cl.
CPC ................... *G06F 11/3636* (2013.01)
USPC ............. 717/128; 717/124; 717/130

(58) Field of Classification Search
CPC ......................................... G06F 9/44
USPC ......................................... 717/128
See application file for complete search history.

(56) References Cited

U.S. PATENT DOCUMENTS 6,697,835 B1 * 2/2004 Hanson et al. ................ 709/201
7,284,153 B2 10/2007 Okbay et al.
7,334,221 B1 * 2/2008 Shapiro ......................... 717/128
8,627,294 B1 * 1/2014 Cantrill ......................... 717/130
2006/0242627 A1 * 10/2006 Wygodny et al. ............. 717/128
2007/0061487 A1 * 3/2007 Moore et al. .................. 709/246
2008/0126301 A1 * 5/2008 Bank et al. ........................ 707/3
2008/0126354 A1 5/2008 Wang et al.
2008/0127110 A1 * 5/2008 Ivanov et al. ................. 717/128

OTHER PUBLICATIONS

Intel® Trace Collector 7.0, Users Guide, Intel Corporation, 1996-2006, pp. 118.*
Intel® Trace Collector 7.0, User's Guide, Intel Corporation, 1996-2006, pp. 118.

* cited by examiner

*Primary Examiner* — Wei Zhen
*Assistant Examiner* — Mohammed Huda
(74) *Attorney, Agent, or Firm* — Omkar K. Suryadevara; Silicon Valley Patent Group LLP

(57) ABSTRACT

A computer is programmed with multiple software programs to record structures including (a) unstructured information to denote a transition between portions of code, and (b) metadata related to one or more attributes of the information. In addition, the computer writes two additional types of structures: section type, and dump type. The section type structure has metadata to indicate a beginning and an end, to bracket a group of structures located therebetween. The dump type has a dump header and a dump body. The dump header includes a symbol to indicate it's of dump type. The dump body is a set of values of an object used by the software program(s) during execution by the computer. A group of structures, within a section type, may include structures of each of the trace record type, dump type and section type.

21 Claims, 12 Drawing Sheets

DUMP object=(REDO LOG DUMP, 1), file="/ade/jklein_jk5/oracle/dbs/log2jk5.dbf"
Opcodes *.*
DBAs: (file # 1, block # 2326) thru (file # 1, block # 2326)
RBAs: 0x000000.00000000.0000 thru 0xffffffff.ffffffff.ffff
SCNs: scn: 0x0000.00000000 thru scn: 0xffff.ffffffff
Times: creation thru eternity
FILE HEADER:
Compatibility Vsn = 169869312=0xa200000
Db ID=243099388=0xe7d66fc, Db Name='JK5'
Activation ID=243109628=0xe7d8efc
Control Seq=34=0x22, File size=102400=0x19000
File Number=2, Blksiz=512, File Type=2 LOG
descrip:"Thread 0001, Seq# 0000000002, SCN 0x00000000820b-0xffffffffffff"
... ... ... ...
End-of-redo stream : No
Unprotected mode
Miscellaneous flags: 0x0
Thread internal enable indicator: thr: 0, seq: 0 scn: 0x0000.00000000

DUMP object = (REDO RECORD DUMP, 0x000002.0000003a.0140), SCN=0x0000.000082ab
    REDO RECORD - Thread:1 RBA: 0x000002.0000003a.0140 LEN: 0x017c
    VLD: 0x01
182    SCN: 0x0000.000082ab SUBSCN: 4 10/24/2005 11:34:42

183——DUMP object = (Change Vector, 1), DBA=0x00400002
    CHANGE #1 TYP:0 CLS:15 AFN:1 DBA:0x00400002 OBJ:4294967295
    SCN:0x0000.000082a4
    SEQ: 1 OP:5.2
    ktudh redo: slt: 0x0003 sqn: 0x0000003f flg: 0x0012 siz: 108 fbi: 0
    uba: 0x00400015.0042.15 pxid: 0x0000.000.00000000
    184——DUMP object = (Change Vector, 2), DBA=0x00400015
    CHANGE #2 TYP:0 CLS:16 AFN:1 DBA:0x00400015 OBJ:4294967295
    SCN:0x0000.0000829e
    SEQ: 2 OP:5.1
    ktudb redo: siz: 108 spc: 5630 flg: 0x0012 seq: 0x0042 rec: 0x15
    ... ... ... ...
    itli: 1 ispac: 0 maxfr: 4863
    tabn: 0 slot: 0(0x0)
    185——DUMP object = (Change Vector, 3), DBA=0x00400916
    CHANGE #3 TYP:0 CLS: 1 AFN:1 DBA:0x00400916 OBJ:896
    SCN:0x0000.000082ab
    SEQ: 3 OP:11.2
    KTB Redo
    op: 0x01 ver: 0x01
    ... ... ... ...
    col 2: [10] 62 6f 73 74 6f 6e 20 20 20 20

FIG. 2A trace ::= {<trace_element>}+ trace_element ::= <trace_record> | <dump> |<section> trace_record ::= 'TRACE_RECORD' <common_trace_data>

<common_trace_data> ::= <freeform_payload> [{attribute}*];

<freeform_payload> ::= <string> dump ::= <dump_header> <dump_body> dump_header ::= <(dump)object_spec_attr> [<(dump)name_attr>]
<(dump)format_attr> [<common_trace_data>]

dump_body ::= {[<client_blob>] [<dump>]}+ client_blob ::= 'BEGIN_CLIENT_BLOB' <anything> 'END_CLIENT_BLOB' section ::= <begin_section> <trace> <end_section> begin_section ::= 'BEGIN_SECTION' <(section)name_attr>
[<common_trace_data>]

end_section ::= 'END_SECTION' <(section)name_attr> [<common_trace_data>]

attribute ::= <native_attr> | <client_attr>

<native_attribute> ::= <name_attr> | <timestamp_attr> | <timeseq_attr> |
<marker_attr> >| <object_spec_attr> | <format_attr>

<client_attribute> ::= <attribute_identifier> <value>

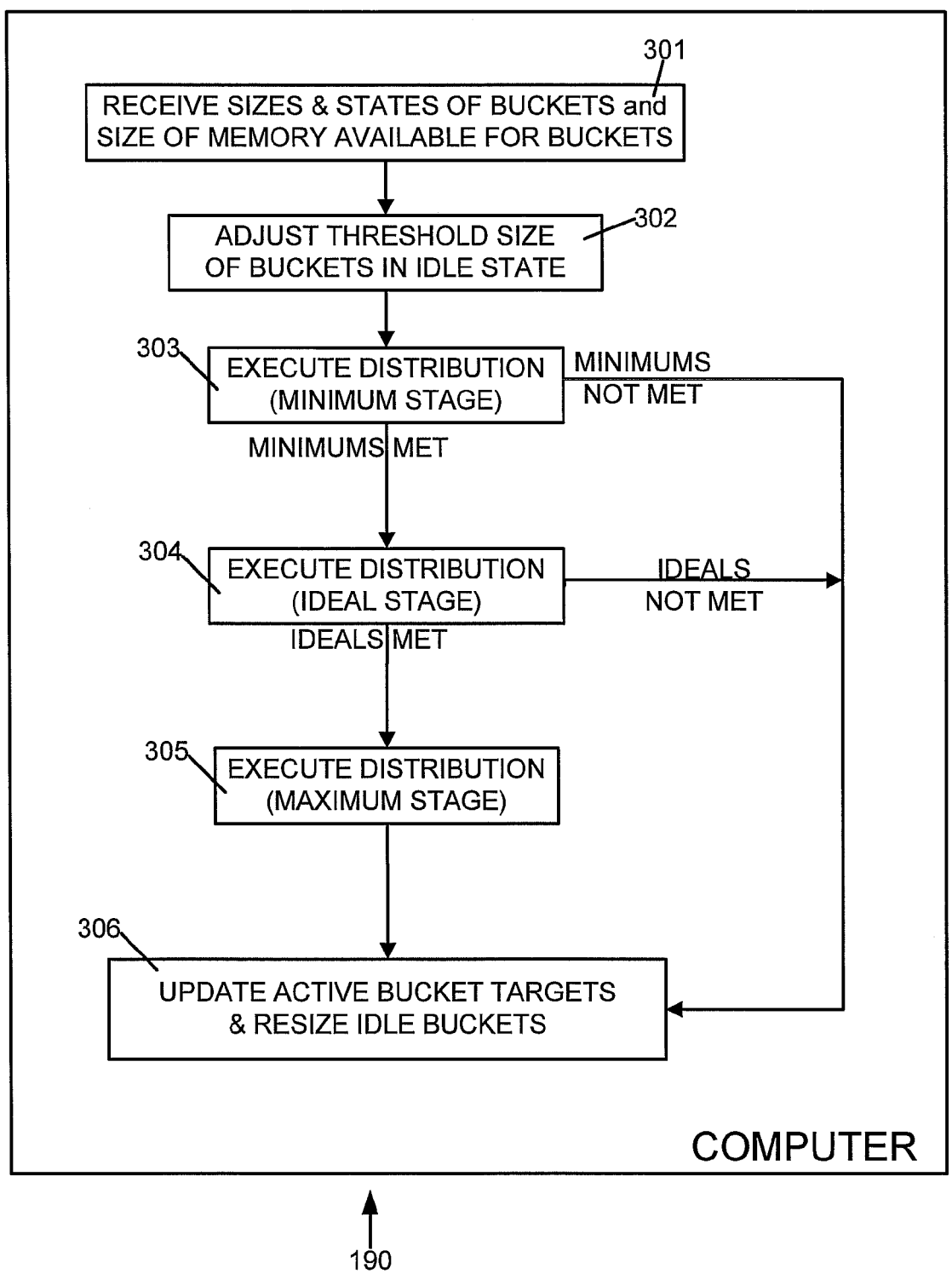

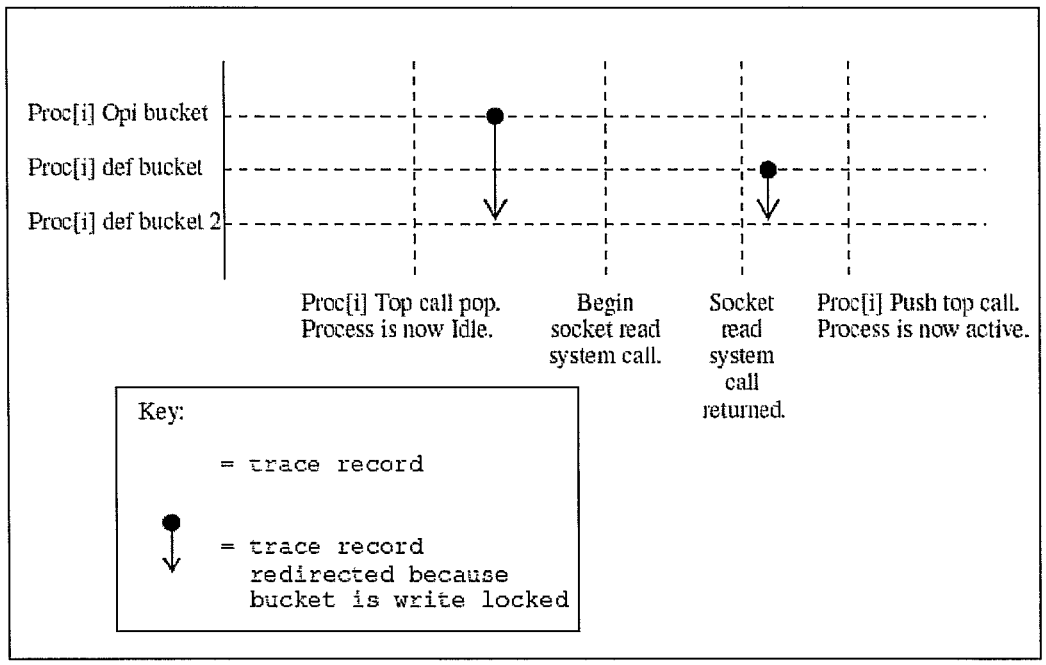
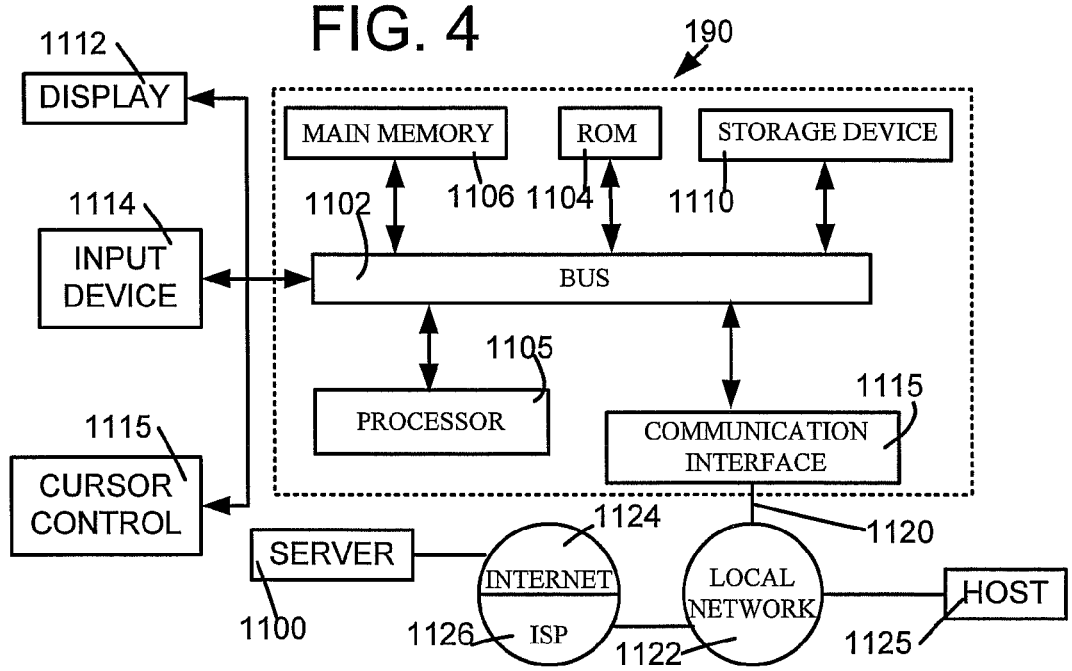

UNIFIED TRACING SERVICE

CROSS-REFERENCE TO PROVISIONAL APPLICATION

This application claims priority under 35 USC §119(e) from a U.S. Provisional Application No. 60/981,440 filed on Oct. 19, 2007 having the title UNIFIED TRACING SERVICE, filed by Benoit Dageville, et al.

U.S. Provisional Application No. 60/981,440 is hereby incorporated by reference herein in its entirety.

BACKGROUND

A very common way to debug a software program is by tracing. Tracing of software programs is described in, for example, column 1, lines 52-61 of U.S. Pat. No. 7,284,153 granted to Oakbay et al. on Oct. 16, 2007 and entitled "Apparatus, Method and System For Logging Diagnostic Information" which is assigned to International Business Machines Corporation. The just-described patent is incorporated by reference herein in its entirety, as background.

Traces outputted by a software program are diagnostic information written to some storage media, e.g. memory, or more generally disk. Tracing is normally used to capture state transitions or state changes within a program as it normally executes in a computer, such as database software. For example, traces may be written to identify a transition between regions in a software program, such as from one region to another region in a function of the software program, e.g. when entering and exiting the function and/or when entering and exiting a loop in the function and/or when a decision is made to take a branch in the function (rather than one or more other branches). Note that writing of such traces may be either independent of or may be triggered by external or internal events. Instructions to write traces are typically included in a software program to show to a flow of execution through the software program (also called "program flow").

As another example, traces may also be written to document transitions between various states of an object, such as a transaction object and/or a SQL cursor in a database. Most commonly, tracing involves a developer writing within the source code of a software program, a mix of one liners, to be output as traces (like "Entering function XXX( ): arg1=YYY arg2=ZZZ") and/or statements to dump data, such as an explain plan dump at the end of SQL compilation.

When a problem arises in a software program that is tracing its execution, the traces being output can help in several aspects: traces allow developers to reconstruct events that lead to errors, helping developers in hypothesizing root causes of a problem; in some cases, tracing can be used to isolate a bug, by process of elimination, to a smaller region of the software program responsible for its root cause. Tracing, especially in-memory, can also help to resolve bugs related to concurrency/timing issues. Finally, pinpointing the root cause of a performance problem can be greatly simplified by using timed traces.

Many varieties of tracing mechanisms have been implemented by various applications in the prior art. Some tracing infrastructure like the ANSI C library function fprintf write directly to an output file without any additional structure and require the software which calls this function to do trace output control checking before invoking the tracing API. Tracing mechanisms which may be structured typically have code layer specific structures which cannot be shared across multiple code layers. Some tracing mechanisms write traces to disk, and do not support in memory tracing. Others do support in memory tracing, however often the implementation suffers from the problem of evicting important traces. For example, if one component executed by a process is more verbose, i.e. generates traces at a much higher rate than other components executed by that process, then the more verbose components traces can evict the traces of less verbose components which makes it difficult to debug the less verbose components.

On-disk tracing can handle the issue of eviction noted above, but typically it cannot be enabled by default because it has no in-memory component. Hence, it cannot be used to diagnose a first failure (described in the next paragraph). A trace file resulting from use of on-disk tracing is free form and has no defined structure. Also, on-disk tracing has no built-in control mechanism so control is very ad-hoc and each component has its own mechanism to enable and disable tracing.

Even though tracing is very useful in debugging a software program, it is usually very expensive to be enabled by default. Proactive tracing may neither be efficient or effective. For this reason, diagnostic information that is generally available to perform first-failure diagnosis is very limited. First failure diagnostic is the ability, out-of-the box, to diagnose an unexpected error, using diagnostic data that is dumped when the error first occurs. Under this condition, it is sometimes necessary to repeat prior execution of a software program with a run-time flag for tracing enabled, to generate traces and resolve a bug. In some cases tracing must be enabled via a compile-time flag, which requires compilation of a special binary of the software program. The binary is patched for diagnostics and must be installed on a customer's computer. The situation is even worse if a bug is not reproducible.

Accordingly, the inventors of the current patent application believe that there is a need to improve prior art tracing.

SUMMARY

In accordance with the invention, a computer is programmed with multiple software programs that record in a storage medium (such as memory and/or disk) information related to execution of the software programs, in structures of a predetermined type (also called "trace record type"). Each structure (also called "trace element") of the trace record type, regardless of which software program wrote the structure, identifies (a) information in an unstructured form which denotes to a human that a transition is occurring between two portions of the software program, and (b) metadata corresponding to the information (a) and identifying one or more attributes embedded within the information (a) or attributes containing information automatically collected when generating the trace record.

In some embodiments, the computer also records two additional types of structures: section type, and dump type. The section type structure contains metadata to indicate a beginning and an end of a group of structures grouped by the section type structure. The dump type structure has a dump header and a dump body. The dump header includes a symbol to indicate it's of dump type. The dump body is a set of values of an object used by software program(s) during execution by the computer. A group of structures, identified by a section type structure, may include structures of each of the trace record type, dump type and section type.

Also, in some embodiments, the above-described structures for each software program are recorded to a bucket which includes a set of buffers, and the size of these buffers is dynamically changed to optimize the use of memory, for problem-solving effectiveness across multiple software programs.

BRIEF DESCRIPTION OF THE FIGURES

FIG. 1E illustrates, a trace element of dump type written by one illustrative implementation of the invention.

FIG. 2A illustrates a grammar used by a programmed computer in some embodiments of the invention.

FIGS. 3A and 3B illustrate, in flow charts, acts performed in an illustrative embodiment to allocate memory to buckets of buffers that store traces in memory of a computer in accordance with the invention.

FIG. 3E illustrates redirection of a trace element to a default trace buffer in some embodiments of the invention.

FIG. 4 illustrates, in a block diagram, hardware portions of the computer illustrated in FIG. 2B.

DETAILED DESCRIPTION

Figure 1A:
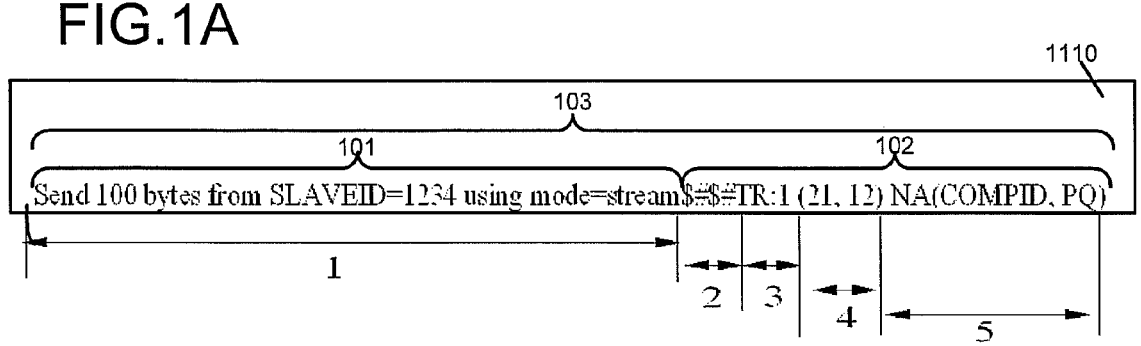
FIG. 1A illustrates a structure (also called "trace element") including metadata written to a storage device 1110 in accordance with the invention.

In accordance with the invention, a computer is programmed to record information related to execution of a computer program in a structure also called "trace element." A trace element 103 (FIG. 1A) is initially written to memory, and can at a later point be written to a disk in a storage device 1110 (FIG. 4). Trace element 103 (FIG. 1A) includes information 101 in an unstructured form (called "free form payload", or "payload"). Information 101 is typically a character string, e.g. expressed in English language, which states to a human that a transition is occurring during execution, from one portion of code to another, in the normal manner. For example, in the trace element shown in FIG. 1A, information 101 is an unstructured statement which states to a human user that 100 bytes are being sent. In addition, a trace element 103 also includes metadata 102 which corresponds to and is associated with information 101. Metadata 102 is used by the computer in displaying the information 101 to a user. Metadata 102 includes a metadata separator 2, a metadata tag 3 to indicate a type of the structure and number of lines, a metadata attribute 4 to indicate a starting position and length of an attribute that is located within information 101, and another metadata attribute 5 which itself holds another attribute.

More specifically, in the example illustrated in FIG. 1A, the string of characters "$#$#" constitutes metadata separator 2. Moreover, in the illustrated example of FIG. 1A, metadata tag 3 contains "TR" which indicates that the structure is of a given type (which is one of several predetermined types, as described below in reference to FIG. 1B), the ":1" indicates that this trace element constitutes one line. Also, in the illustrated example of FIG. 1A, metadata attribute 4 is the string "(21, 12)", which identifies an attribute which is embedded within information 101 starting at character position 21, and extending for 12 character positions, which in this example indicates that the string "SLAVEID=1234" embedded within information 101 is an attribute. Such an attribute, which is included in information 101 by a software program, is also referred to herein as a user attribute. Note that the just-described user attribute has two portions within the identified string which are located on the left side and right side of the "=" symbol: a name "SLAVEID" and a value 1234. User attributes (also called "program-specific attributes") are normally specified by a user (i.e. a software developer), when developing a software program to trace a flow of execution. Accordingly these attributes may have different names depending on the code and data related to the information being recorded in a trace element.

In addition, referring to FIG. 1A, metadata attribute 5 contains the string "NA(COMPID, PQ)" wherein "NA" denotes an attribute that is common across multiple programs in the computer (also called "native attribute"), the string "COMPID" identifies a component by its identifier, and the string "PQ" is a value of the identifier, which identifies a specific software program that wrote trace element 103. The native attributes are generic across all software programs in some embodiments, and are typically used commonly across multiple trace elements regardless of which software program records the trace element. In some embodiments, different native attributes (also called "program-generic attributes") are recorded for different types of (or sources of) trace elements.

Recording of one or more portions of metadata 102 (FIG. 1A), in addition to recording information 101, enables appropriate processing of the recorded information 101 by a tool executing in a computer. For example, certain trace elements can be selected by the tool, from among numerous trace elements of the type illustrated in FIG. 1A which may be recorded in a repository, by filtering on a user-specified value of user attribute SLAVEID, by use of metadata attribute 4 in metadata 102. Filtering by such a tool may be further based on the native attribute COMP ID by use of metadata attribute 5. Recordation of metadata 102 which uniquely describes user attributes of information 101 enables tools to programmatically process information 101 based on the user attributes even though information 101 is unstructured.

Note that although a specific example has been illustrated in FIG. 1A and described above, other examples and embodiments will be readily apparent to the skilled artisan in view of this disclosure. Accordingly, although in FIG. 1A, information 101 precedes metadata 102, in other embodiments, information 101 follows metadata 102 as illustrated by trace element 130 in FIG. 1B and described below. Moreover, although "TR" is used to identify the trace element's type other such strings and/or characters are used in other embodiments. Also, such other embodiments may have fewer types or more types of trace elements than the three trace elements described below in reference to FIG. 1B.

Figure 1C:
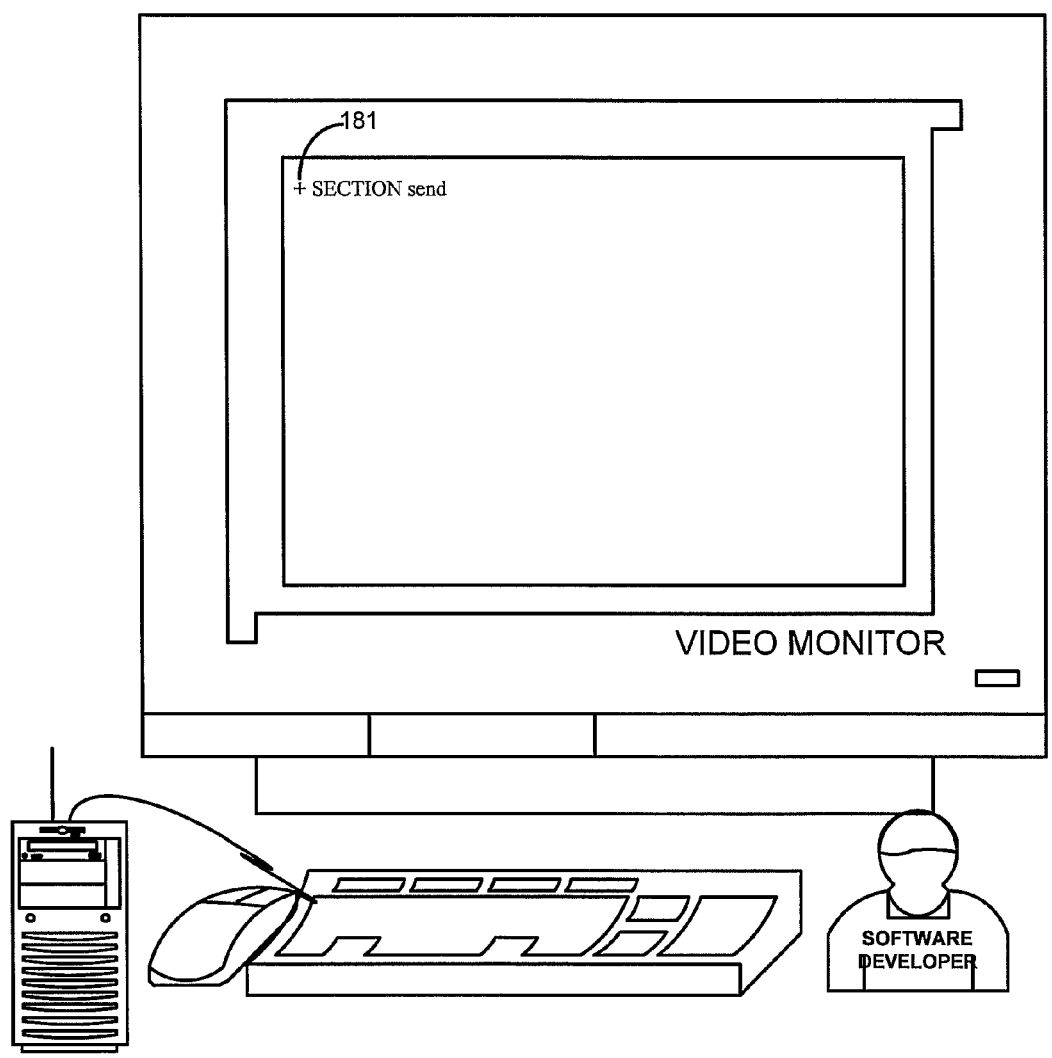
FIGS. 1C and 1D illustrate a display of trace elements on a video monitor, with the information of trace elements being selectively displayed hierarchically by use of metadata of the type shown in FIGS. 1A and 1B, in accordance with the invention.
Figure 1B:
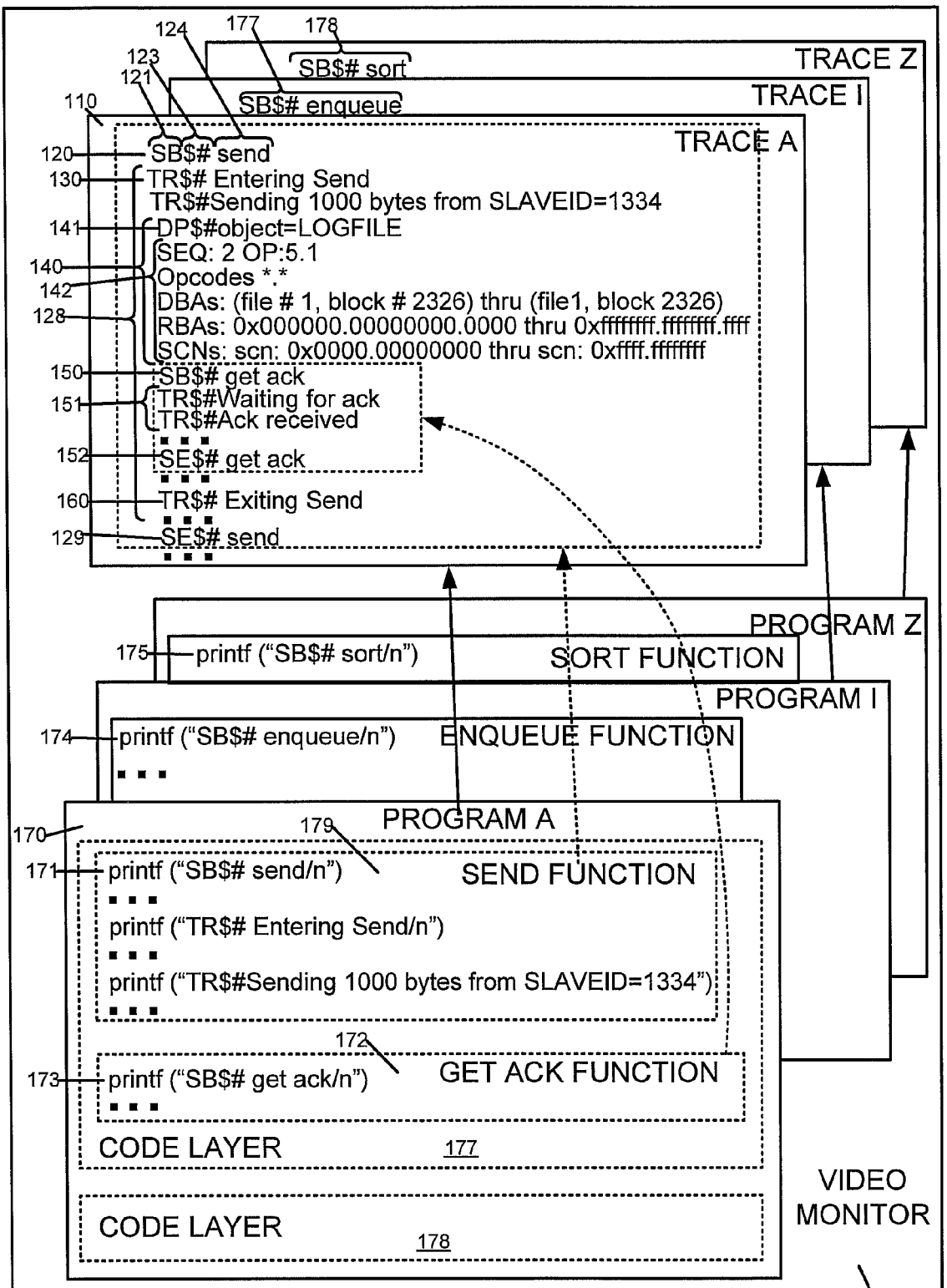
FIG. 1B illustrates a display generated by a software tool (called "viewer") on a video monitor of a computer, trace elements of three types written by multiple software programs in accordance with the invention.

Also, in some embodiments as illustrated in FIGS. 1A and 1B, metadata 102 and information 101 are both written into a single file, with metadata 102 being written physically adjacent to information 101 and separated therefrom by a predetermined string of character(s). However, in certain embodiments, metadata 102 is written to a first file ("metadata file") which is different from a second file ("trace file") to which information 101 is written in unstructured form. In the just-described embodiments, metadata 102 and information 101 of a given trace element have a one-to-one correspondence with one another. The one-to-one correspondence is implemented in one example by including in each metadata 102 (a) an offset of its corresponding information 101 relative to a beginning of the trace file and (b) a length (in bytes) of the corresponding information 101 from that offset. Note that instead of (or in addition to) the length of information 101, another offset indicative of an end of information 101 may be stored in other embodiments. A correlation is implemented in yet another example by associating a unique identifier with each of information 101 and metadata 102, whereby identifiers of information 101 and metadata 102 being identical to one another indicates a one-to-one correspondence.

Furthermore, although a comma "," is used in FIG. 1A in the string "NA(COMPID, PQ)" to separate the attribute name from the attribute value, the symbol "=" can be used in other embodiments. Moreover, although the string "SLAVEID=1234" is used in FIG. 1A, a comma can be used in other embodiments. Accordingly, a specific format which is used to write trace element 103 to a disk can be different in different embodiments, so long as the computer is appropriately programmed to use the same specific format in reading trace element 103 back from disk prior to display to a user.

In some embodiments, in addition to writing the above-described trace element (of a type called "trace record type"), the computer is also programmed to record in memory two additional types of structures: section type, and dump type. The section type has metadata to indicate a beginning and an ending, which together identify a group of trace elements. For example, FIG. 1B illustrates a display by a viewer in a computer, of metadata used to denote a beginning section 120 and metadata used to denote an ending section 129 that together bracket a group 128 of structures, such as structures 130, 140, 150 and 160. Note that in certain embodiments, the entire group 128 of structures is created by a single function or by a portion of a function.

An example trace 110 is illustrated in FIG. 1B as including metadata for a beginning section 120 wherein first metadata tag 121 contains the string "SB" which indicates that the type is for the beginning of a section, followed by metadata separator 123 formed by the string of characters "$#", followed by the string "send" which constitutes a name 124 of the section. Moreover, in FIG. 1B, second metadata for an ending section 129 includes a second metadata tag containing the string "SE" which indicates that the type is for the end of the section, followed by the metadata separator containing the string of characters "$#", followed by the string "send" which is the name of the section. In certain embodiments, section name 124 is same as the name of a function which creates all trace elements within this section, such as send function 179 in program 170. Although in FIG. 1B, section name "send" is used in both beginning section 120 and ending section 129, other embodiments may include the section name in only one but not the other of these metadata around group 128 of trace elements in a section.

Note that FIG. 1B is a conceptual illustration of traces A . . . I . . . Z and this figure is used to primarily to outline the contents of a trace in an easy to read way for humans. Also, when traces A . . . I . . . Z are written to disk, in several embodiments, a file which contains metadata of one or more of these traces is written in binary. In certain embodiments, a metadata trace file is compressed to reduce disk space that would otherwise be required to store the file in storage device 1110 (FIG. 4). The specific manner in which attributes and/or indications of the attributes are packed or the manner in which a binary trace file is compressed are not critical aspects of the invention. In addition, when traces A . . . I . . . Z are written to disk, the unstructured information is written to another file, in text form, and the text file is not compressed. Thus the text file of unstructured information is available to software developers for viewing via any text editor in the normal manner, thereby to maintain backward compatibility with existing diagnostic practices of a vendor of application 282.

Also, although in some embodiments beginning section 120 and an ending section 129 are shown as being physically located before and after group 128 of trace elements, in other embodiments they may be located in other positions. For example, certain embodiments use offset and length as the first metadata and the second metadata respectively of a section, to identify a group of trace elements as follows: denote a beginning of the group by identifying, relative to a beginning of a trace file, an offset at which the first trace element in group is located, and denote an ending of the group by identifying a length relative to the first trace element's beginning.

Figure 1D:
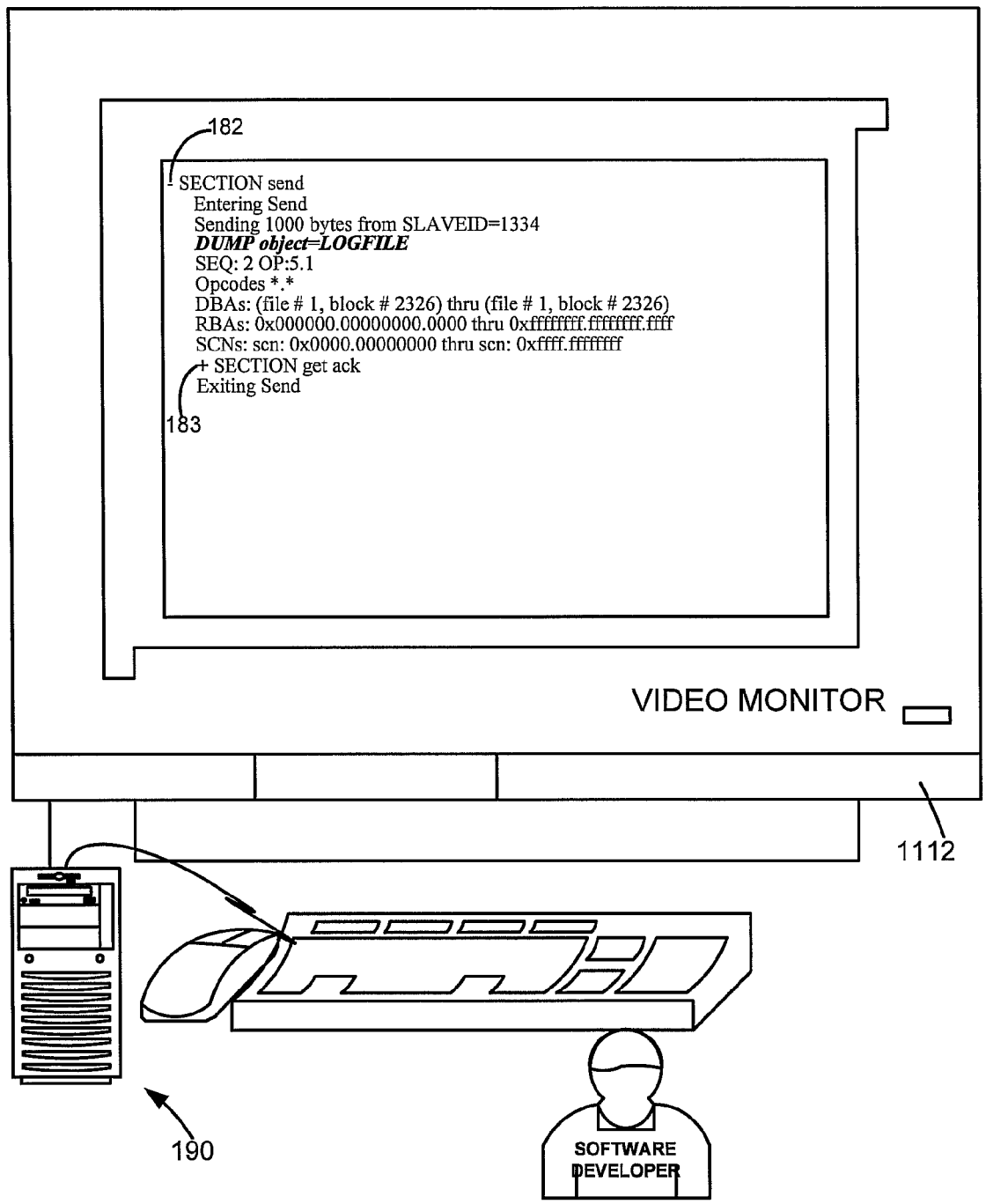

Trace elements in group 128 may include additional trace elements that are of section type and/or trace elements that are of the trace record type. As will be readily apparent to the skilled artisan, identification of a group of trace elements by use of first metadata and second metadata of a section type enables graphical display on a video monitor, of a tree structure representing trace elements at varying levels of abstraction depending on corresponding levels of bracketing. For example, a section may be initially displayed with a "+" symbol 181 without displaying individual trace elements within group 128 as shown in FIG. 1C. Information of individual trace elements in a section's group is displayed in response to a user's clicking on the displayed "+" symbol 181 in FIG. 1C, which is then changed to a "−" symbol 182 as shown in FIG. 1D, followed by display of information in the trace elements in group 128 (FIG. 1B). Similarly, the user's clicking on the displayed "+" symbol 183 in FIG. 1D causes computer 190 to change the symbol 183 to "−" symbol (not shown) followed by display of information in trace elements 151 (FIG. 1B).

In addition to trace elements 130 and 160 (FIG. 1B) that are of the trace record type, and trace elements 120 and 150 (FIG. 1B) that are of the section type as described above, a computer of some embodiment is programmed to store in memory a third type of trace element, which is of a third type called "dump type" and illustrated by trace element 140 (FIG. 1B). Specifically, trace element 140 of the dump type has a dump header 141 and a dump body 142. The dump header 140 includes a character string "DP" to indicate it's of dump type followed by a separator "$#", followed by an attribute of an object's value being captured in the dump body. In the illustrated example of FIG. 1B, the attribute includes the string "object" which denotes the attribute's name, followed by the string "LOGFILE" which denotes the attribute's value. To summarize, dump header 140 indicates that object LOGFILE is currently being used by a software program that is being traced and the LOGFILE object's values are being captured.

Dump body 142 contains value(s) of the object as well as names of fields whose values are being captured.

Note that in some embodiments as illustrated in FIG. 1E, a trace element 181 of the dump type may include therein one or more additional trace elements which are also of the dump type, such as trace element 182. In FIG. 1E, trace element 182 of the dump type itself includes additional trace elements 183, 184 and 185 each of which is also of dump type.

As noted above, in certain embodiments, a single function or a portion thereof creates all trace elements within a section, e.g. send function 179 (FIG. 1B) creates section 120 and get ack function 172 creates section 150. Both functions 179 and 172 (FIG. 1B) are portions of a code layer 177 within program 170 (also called program A) which creates trace 110 (also called trace A). Code layer 177 is just one of two or more code layers included in program 170. Note that trace A is just one of several traces A . . . I . . . Z that are respectively created by corresponding programs A . . . I . . . Z during execution of these programs by respective threads and/or processes within computer 190.

Figure 1F:
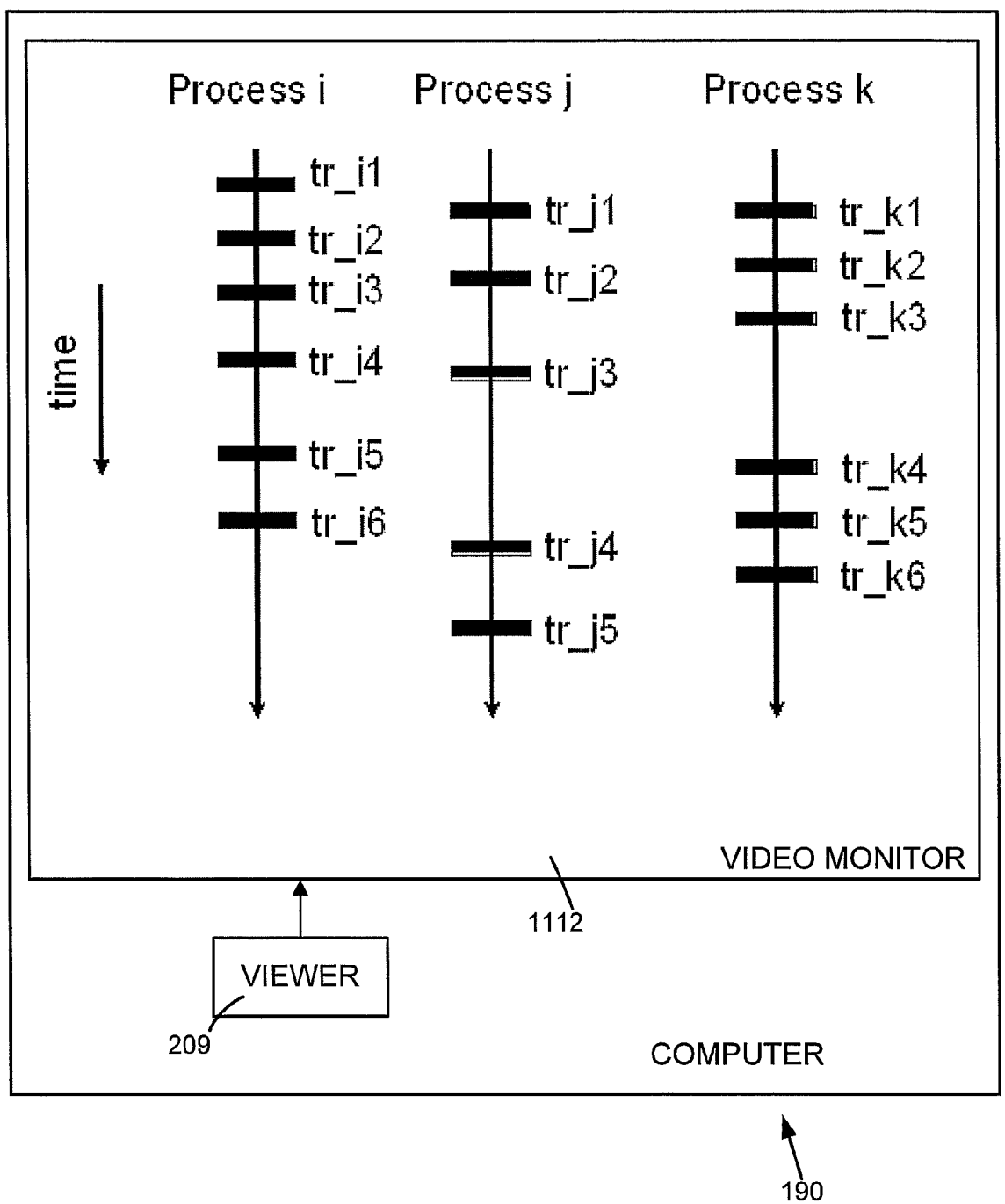
FIG. 1F illustrates a display on a video monitor, by a viewer in a computer, of trace elements created by three processes in three sequences respectively as a function of time, in accordance with the invention.

In several embodiments, each function within each program creates its own section. For example, an enqueue function 174 in program I creates section 177 in trace I, and a sort function 175 in program Z creates section 178. In a display on a video monitor that is generated by a viewer in a computer as illustrated in FIG. 1F, each process may define a section only on its own traces, i.e. a section can only be defined on trace elements tr_i1 to tr_i6 (e.g. by process i), or on trace elements tr_j1 to tr_j5 (by process j) or on trace elements tr_k1 to tr_k6 (by process k). Accordingly in these embodiments, a section in a trace cannot contain trace elements that are produced by multiple processes.

In FIG. 1B, a computer 190 is shown programmed to record a trace element to memory using a printf call in statement 171 in send function 179, the printf call is merely an illustration. More specifically, the name of a function (such as "printf") which is used to store a trace element in memory depends on the implementation. In using common software called unified tracing service (UTS), multiple programs A . . . I . . . Z in computer 190 share a single API to record traces A . . . I . . . Z (FIG. 1B) into a pool in memory and/or write the traces to disk in storage device 1110 (e.g. in a repository therein). UTS records unstructured information from a program A . . . I . . . Z which is identified by such a function, as well as metadata uniquely corresponding to that unstructured information, using a common format and grammar across all programs A . . . I . . . Z, so that the information and metadata can be programmatically parsed at a later point in time by a common tool.

Depending on the embodiment, a front end 201 in UTS 283 may support one or more features commonly required by software programs A . . . I . . . Z to write trace elements to a storage device 1110 of a computer 190, such as time stamping of trace elements (e.g. in a native attribute), marking trace elements with a marker (e.g. in another native attribute), allocating portions of main memory to hold trace elements written during in-memory tracing, and creating files into which trace elements are written during on-disk tracing. Note that UTS 283 in some embodiments is implemented in an application 282 which may be, for example, a relational database. Also depending on the embodiment, software program A may be a portion of application 282, and/or software program I may interface with application 282 and/or software program Z may be outside of computer 190, e.g. executing in another computer but using the same UTS code library.

As noted elsewhere herein, application 282 may be, for example, a relational database software and in this example software program A may be, for example, a database module for compiling an SQL statement whereas software program B may be, for example, another database module for executing the SQL statement. Use of a section type of trace element as described above, by a software program B, groups together multiple trace elements that are generated by various functions called during execution of the SQL statement. Accordingly, by use of a section type of trace element, a tool displays on a video monitor of computer 190 all trace elements in a repository that result from execution of a specific SQL statement, regardless of which function generated each trace element.

Figure 2B:
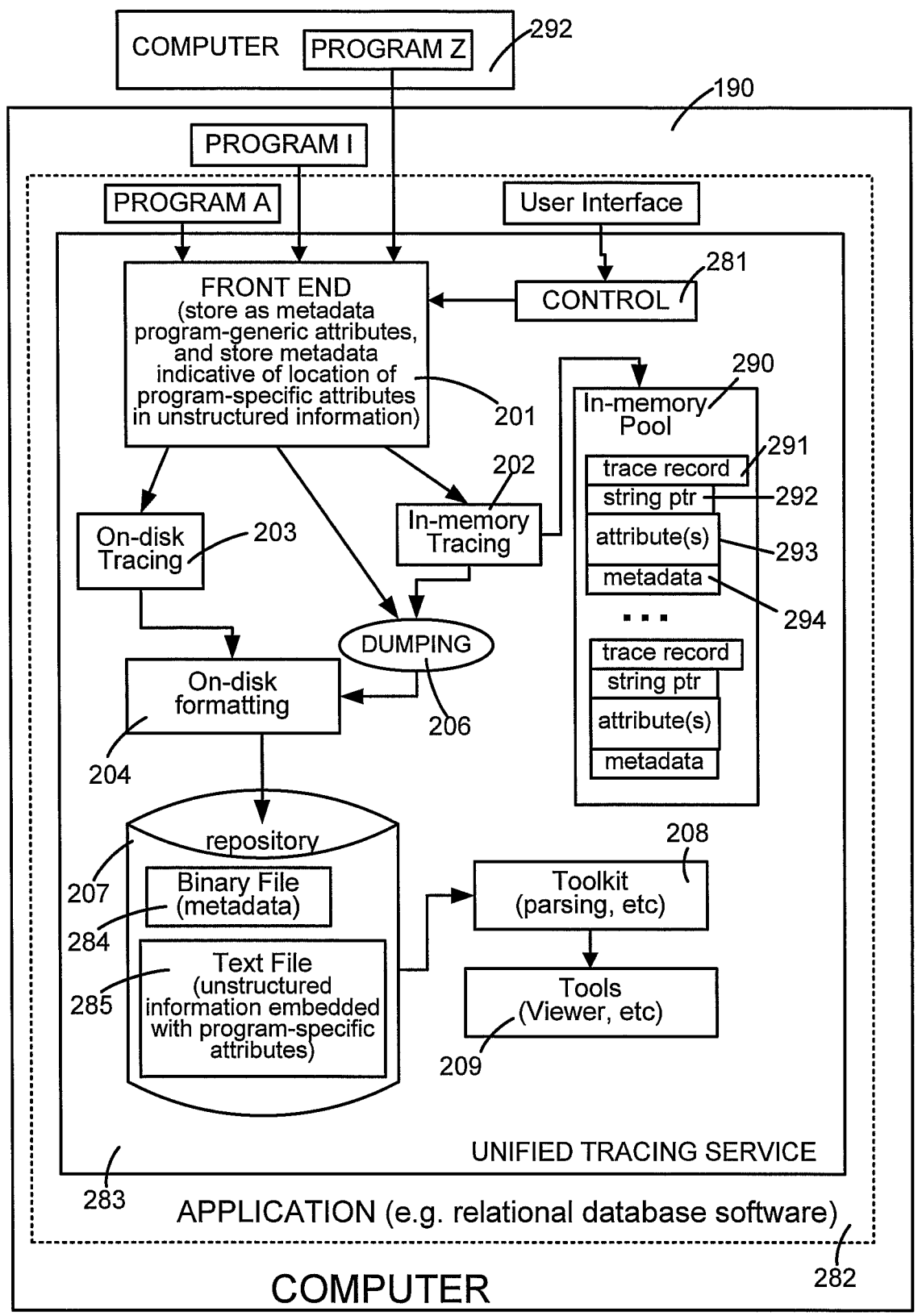
FIG. 2B illustrates, in a high-level block diagram, a computer programmed in accordance with the invention to write to memory trace elements of the type illustrated in FIGS. 1A and 1B and to generate the display illustrated in FIGS. 1C, 1D and 1E.

UTS 283 in some embodiments of computer 190 implements a BNF grammar of the type shown in FIG. 2A to express the content of a trace. Note that the grammar in FIG. 2A is a logical BNF because this BNF is only showing the logical structure of a trace and does not represent an in-memory or on-disk representation of the trace. As illustrated in FIG. 2A, and as noted above, trace elements include metadata in the form of attributes, to allow a viewer 209 (FIG. 2B) or other tools to filter and correlate the information of trace elements faster and more accurately than in the absence of attributes. Furthermore, similar to SQL "select" queries, attributes are used by computer 190 of some embodiments to support a user making projection type of queries (i.e. what is the value of attribute "qbcName" for trace record XYZ). An attribute is defined in some embodiments of computer 190 as a (name, typed-value) pair, where "name" is the name of the attribute, and typed-value is the value of the attribute optionally including its type. For example, (sql_id, '93s9k7wvfs05m') is one illustrative attribute and (qbcp, 0xBE5644245) is another illustrative attribute.

In several embodiments, attributes have single values, however certain embodiments also support special attributes that have multiple values. For example, a marker attribute of some embodiments has three values: marker name, marker id and the marker sequence number. In some embodiments, the supported data types for the values of an attribute are numeric, string, enumerated and pointers. The pointer type is used by UTS 283 in some embodiments for pointing to structures in memory without copying the contents, because copying large structures can be expensive. Attributes of many embodiments are classified into three classes: native attributes defined by UTS, user-defined attributes, and user-implicit attributes. The user-defined attributes are also referred to herein as "user attributes" or "program-specific attributes", and user-implicit attributes are also referred to herein as "opaque attributes."

Native attributes also called program-generic attributes are those attributes of a trace element that are defined ahead of time by the UTS software (when first executed by computer 190). Hence, program-generic attributes are known by the UTS, and the attribute names have the same meanings across multiple software programs A . . . I . . . Z as illustrated in FIG. 1B. For this reason, a viewer tool 209 (FIG. 2B) in computer 190 provides generic functionalities to a software developer by use of these attributes, such as displaying trace elements ordered based on UTS-defined timestamps, displaying a listing of all section names in a trace, displaying a matching of first markers with last markers (see marker attributes described elsewhere), and displaying all instances of a dump referred by a trace record.

Note that native or program-generic attributes are not required to be implicit in the sense that they may be used by software developers (also called "users") explicitly. In terms of naming convention, certain embodiments name native attributes with a known convention (e.g. using a $ sign at the end, like "name$") in order to avoid any naming conflict with user-defined attributes. In some embodiments, certain native attributes (such as time stamp, and program name) are automatically included by UTS in metadata of a trace element, i.e. without user's request to record these attributes.

Several embodiments of the UTS support a user's request to record the following native attributes that are predetermined for the multiple software programs A . . . I . . . Z. One native attribute is name, which has different meanings for different types of trace elements: for sections, name represents section name while for dumps, name represents the name of the dump, which is probably the dumped object type (e.g. PROCESS_STATE). This attribute is optional in a dump. Hence the name attribute itself cannot be used to determine a structure and needs to combine with other attributes, such as flags, to be correctly interpreted.

Component name is another native attribute name that is defined externally in a hierarchical way by UTS corresponding to programs A . . . I . . . Z and/or layers of code. For some embodiments, the following syntax is used: <product_type>.<Component>[.<Subcomp>.<Subsubcomp>.<Subsubsubcomp>]. Internally in computer 190, programs A . . . I . . . Z (also called components) are identified and manipulated using an identifier (e.g. a ub4). A code layer compile time service in computer 190 manages the association between a component's identifier and its name displayed to a human user (and vice-versa). This compile-time service is also described herein as "Component Management".

Timestamp is another native attribute supported by UTS. In some embodiments, ordering of trace elements and time range searching are built-in functionalities of UTS, and hence UTS does not rely on any timestamp provided by a software program (also called "client" or "component"). If a client asks for it—this is on demand for trace elements because too expensive to be done by default in some embodiments—UTS tags implicitly a trace element with this attribute. However for the case of dumps, UTS tags timestamps with the dump headers since the cost of getting a timestamp compared to dumping is probably negligible. Note that this native attribute does not preclude clients from defining their own timestamp attributes.

Timeseq is another native attribute supported by UTS that may be used instead of a component obtaining a timestamp from the operating system for each trace record which can be very expensive (and hence performed only for very few trace elements, in a controlled way). Accordingly in some embodiments, timeseq is a replacement for a timestamp, and the time sequence is used by UTS to order trace elements in a chronological way when two or more traces are merged together. This might be done also only on demand since producing it can still be expensive, even if far less expensive than a regular timestamp from the operating system.

Flags is another native attribute supported by UTS which contains the flag information of trace elements, for example it includes trace element type information: dump, section, and marker.

Marker is yet another native attribute supported by UTS which is made of a marker name (e.g. SQL cursor), a marker id and a marker sequence number. The marker name/id pair is used to mark a subset of trace elements to explicitly connect them. This attribute is used to track and easily extract all trace elements emitted on behalf of a particular object state transition. Marker id is a unique number to differentiate different instances of the same marker name and it is handled by the UTS infrastructure. A marker sequence number is used to order trace elements with the marker name/id pairs such that the UTS can identify the first and the last marker and detect any gaps between these two end points (lost trace). UTS of some embodiments exposes an API to manage markers (creation) and transparently increments the sequence number, every time a particular marker is used.

Object is still another native attribute whose goal is to uniquely identify an object. It is used in both dumps and trace elements. In dumps, it represents the object being dumped. In trace elements, it is used as a reference to the object dumps and UTS provides a way to fetch the dump adjacent to a trace record. An object attribute has two components: a namespace part (e.g. QBC, STATE_OBJECT, . . . ) and a unique identifier within this namespace. This unique identifier is either generated by UTS or supplied by the client.

In addition to native attributes, UTS of some embodiments also supports including user-defined attributes in trace elements. Specifically, user-defined attributes are individually defined within software programs (or clients) and hence they are not known to UTS, i.e. UTS does not understand the semantic meanings of these attributes, and a viewer tool only provides primitive searching capabilities, such as equality searching. However in some embodiments, tools for the specific software programs (i.e. clients) are built to understand the semantic meanings of these attributes and provide more intelligent functionalities.

In addition to native attributes and user-defined attributes, UTS of some embodiments allows inclusion of user-implicit attributes (a.k.a. opaque attributes) in trace elements. The user-implicit attributes are not known as attributes to UTS and are implicit because they are buried somewhere in a trace element's free form payload string built by software programs A . . . I . . . Z (also called "clients"). A client may use some predetermined notation (e.g. att_name=<value> or att_name:<value>) that is unknown to UTS. Hence an opaque attribute's names and values are not treated as attributes by UTS, i.e. no metadata is recorded by the UTS for any opaque attributes. Certain embodiments of UTS do parse the payload string to find (and tools allow a user to query) these implicit attributes. However, in several embodiments of UTS, the term attribute refers to only two types of attributes: user-defined attributes and native attributes, i.e. opaque attributes are not considered as attributes.

FIG. 2B represents a functional and high-level architecture of UTS in some embodiments of the invention. As noted above, clients of UTS are software programs A . . . I . . . Z that record and/or write traces to a storage media. Internally, the illustrative UTS of FIG. 2B includes the following main components: UTS Front-End 201, In-Memory Tracing layer 202, On-Disk Tracing layer 203, On-Disk Formatting layer 204, Dumping layer 206, a repository 207 (on disk in storage device 1110), Toolkit 208, and Tools 209. Each of these components is described next.

UTS Front-End 201—this layer provides the APIs for programs A . . . I . . . Z to generate in memory and on-disk traces (FIG. 1B) as well as to produce dumps both manual dumps and dumps produced on behalf of incidents. Control software 281 (FIG. 2B) to determine whether a particular trace element is active and where this trace element is to be written (i.e. in-memory, on-disk or both) interfaces with the UTS front-end 201. The controls software 281 is accessible via a user interface (e.g. of a relational database), to enable a software developer to view and change flags related to whether a trace element is active.

In-Memory Tracing layer 202—this component writes trace elements to memory 1106 in circular in-memory buckets. Writing to these in-memory buckets is made efficient, with effective retention of data. Note that for performance reasons, in memory traces are not formatted by UTS of some embodiments, until they are written to disk. In one such embodiment, trace elements are stored by layer 202 in an in-memory pool 290. The trace elements typically include (a) a trace record type indicator 291, in the form of a symbol common across software programs A . . . I . . . Z, (b) a pointer 292 to a text string in information 101, (c) one or more attributes 293 specified by a software program I that records the trace element, and (d) metadata 294 that describes the location of user attribute within information 101.

On-Disk Tracing layer 203—this component is responsible for routing trace elements to be written to disk. It outputs to the On-Disk Formatting layer 204.

On-Disk Formatting layer 204—this layer converts trace elements from programs A . . . I . . . Z or from buckets (of in-memory tracing) into a unified structured trace format of the type described above, e.g. in reference to FIG. 1A. On disk trace format includes trace API input provided by programs A . . . I . . . Z along with metadata added by UTS to preserve information in a structured manner. Hence, trace elements are written in a format parse-able by a Toolkit 208, and consumable by any diagnostic tools (Viewer, Optimizer Diff, etc.) in computer 190. The output is written to a file that corresponds to each thread and/or process.

Dumping layer 206—this layer is used to dump in-memory buckets to disk or by Manual Dumping.

Repository 207—also called "Automatic Diagnostic Repository" or "ADR" is a place in storage device 1110 where on-disk trace information is stored. For example, UTS writes to a trace file (e.g. in ASCII format), information of trace elements generated by programs A . . . I . . . Z, as well as information of manual dumps. Information in the just-described trace file is viewable in any text editor. Repository 207 also holds metadata that UTS creates, corresponding to each trace element in the just-described trace file. The metadata is stored in repository 207 in the same file as the information of a trace element in some embodiments, whereas other embodiments use a different file to hold metadata (such as a binary file that is compressed).

Toolkit 208—this layer provides APIs to retrieve on-disk trace information from repository 207. Diagnostic tools (such as a Viewer) use this service to post-process trace data for bug diagnosis. The content of the traces is parsed and returned to the callers in a structured format. APIs are provided to diagnostic tools by this toolkit, to navigate through trace files in repository 207.

Tools 209—these are debugging tools built for developers to view on-disk diagnostic data to diagnose bugs. For example, a Viewer is a tool that can be used to correlate traces and dumps. The Viewer is built on top of UTS.

Figure 2C:
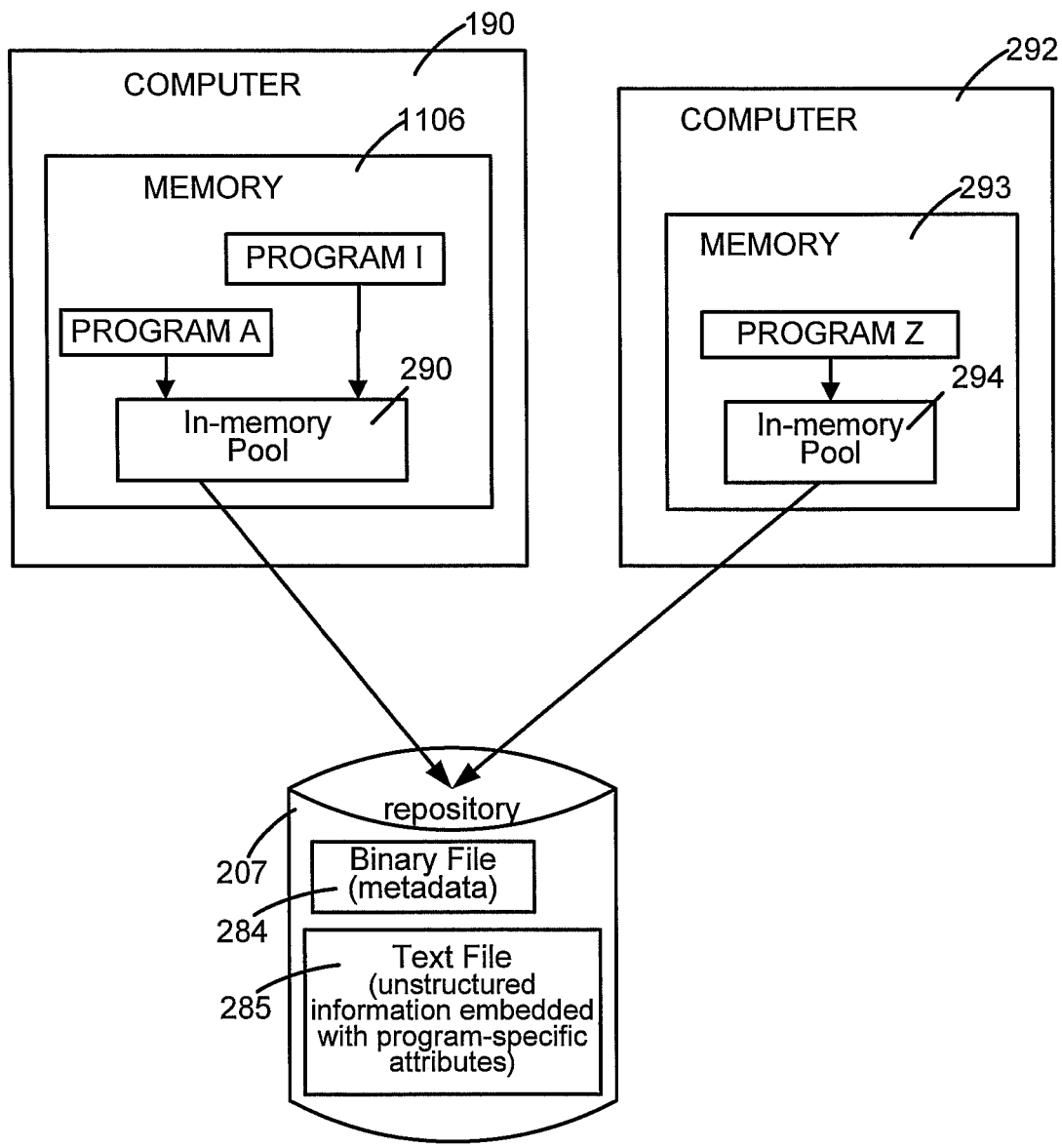
FIG. 2C illustrates, in an intermediate-level block diagram, two computers (of the type shown in FIG. 2B) storing trace elements to pools in memory that are eventually written to a common repository on disk.

FIG. 2C illustrates a memory 1106 in computer 190, including software (e.g. binary executable code) of programs A . . . I. When programs A . . . I are executed by a processor in computer 190, UTS therein stores trace elements to a common pool 290 which is also located in memory 1106. Programs A . . . I of this example share the same pool 290, although in other examples different pools are used. Specifically, as shown in FIG. 2C, trace elements generated by program Z are written to a different pool 294 located in a different memory 293 in a different computer 292, although program Z also uses UTS in a manner similar or identical to programs A . . . I. In the example of FIG. 2C, the trace elements in pools 290 and 294 are written to a common repository 207 on a disk in storage device 1110 (FIG. 4) that is coupled to and accessible by both computers 190 and 292 e.g. via a local area network 1122 and/or Internet 1124 (FIG. 4).

Figure 3B:
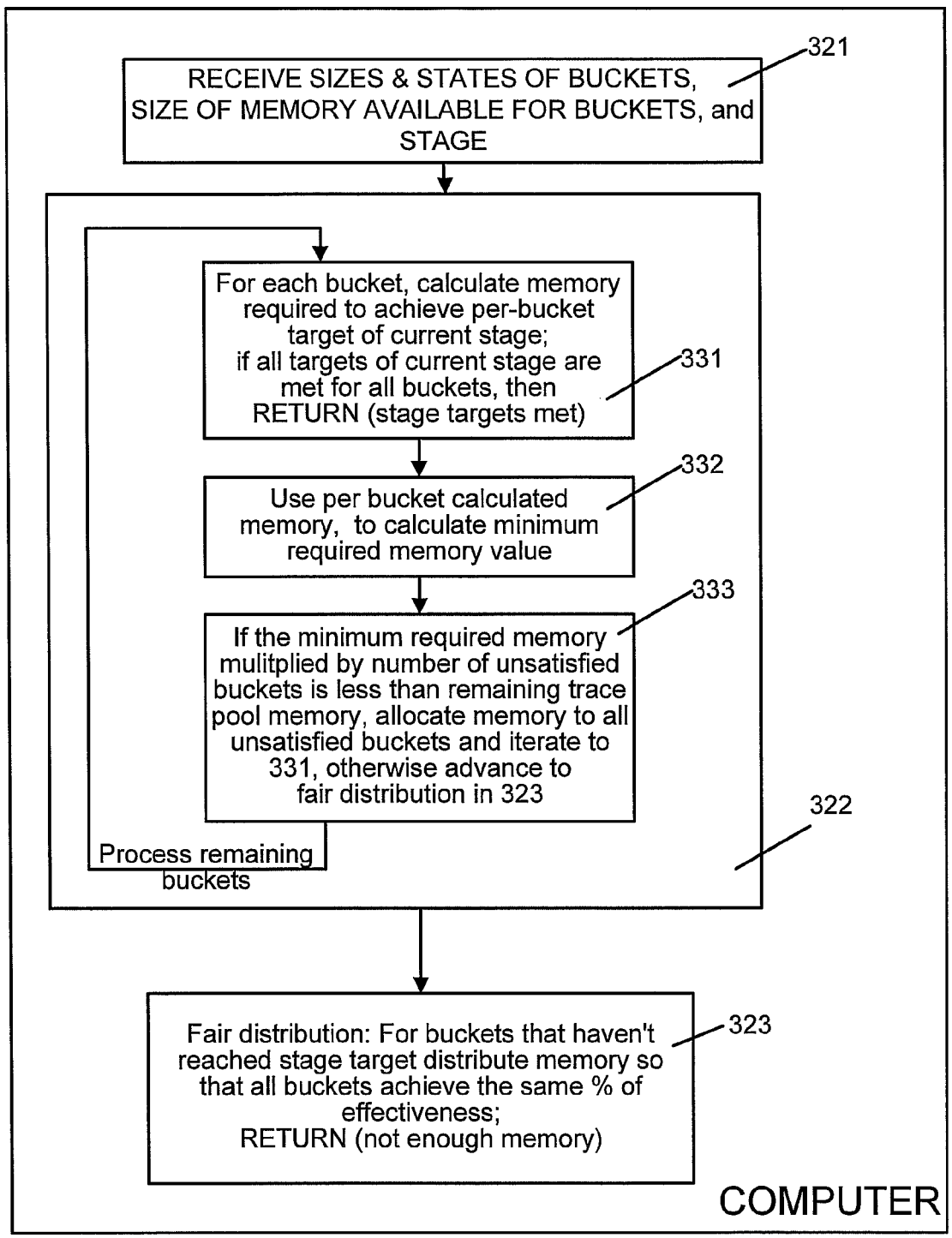

In certain embodiments, computer 190 is programmed allocate memory to buffers that hold trace elements in memory 1106 by performing the methods illustrated in FIGS. 3A and 3B. The buffers are of fixed size, and are grouped into buckets. Memory is allocated to buckets in multiple stages based on bucket creation parameters specified to UTS by the programs A . . . I . . . Z, including: minimum size, ideal size, maximum size. These three bucket creation parameters are received for each process and/or thread, in an act 301. These three parameters may have different values for buckets of idle processes, because idle processes may have different trace retention requirements. For this reason, computer 190 also receives in act 301 a state of each bucket, i.e. whether a bucket's process is idle or active (i.e concurrently executing).

In addition to information on all the buckets and their parameters the computer 190 also receives in act 301, the total amount of memory 1106 which is available for allocation to the buckets. Note that the amount of memory for allocation to buckets is predetermined, and may be set to, for example, 1% of total memory of an application (such as an RDBMS) that uses UTS. Next, in some embodiments, threshold sizes of buckets in the idle stage are adjusted in act 302. For example, maximum size and ideal size of a bucket that is idle are set to the minimum size of that bucket, by performance of act 302.

Next, in acts 303-305, the three bucket creation parameters are processed in the order of minimum size first, followed by ideal size, and then maximum size. These three parameters are respectively inputted as targets for each stage performed by the respective act 303-305. If enough memory is available within a stage (e.g. minimum stage act 303) to satisfy the respective targets of all buckets for that stage, then the next stage (e.g. ideal stage act 304) is processed with the memory from the previous stage allocated to the buckets and removed from the available free memory. If all the memory is used up by memory allocation in any stage (e.g. act 303), then any remaining stages are skipped and bucket size updating act 306 is performed.

Within each of stages 303-305, the method uses up free memory iteratively as follows. Referring to FIG. 3B, in act 321 the computer 190 receives the sizes and states of buckets, the size of memory available for buckets and the stage. Next, in act 322, the computer calculates (in act 331), based on the bucket creation parameters, the amount of memory required to achieve the stage's threshold. Next, as shown in FIG. 3B, the computer performs act 332 to find the bucket with the smallest amount of memory required to reach its target for the current stage (excluding buckets that have already reached their stage target). Next, in act 333, for all buckets that have not reached their stage target, computer 190 tries to allocate this minimum amount of memory to all of them. If it can do so because there is enough free memory, it assigns the memory to those buckets, and then it iterates back to acts 331 and 332 to find the next bucket with the smallest amount of memory required to reach its target. Through each iteration at least one additional bucket meets its stage target bucket size.

Figure 3C:
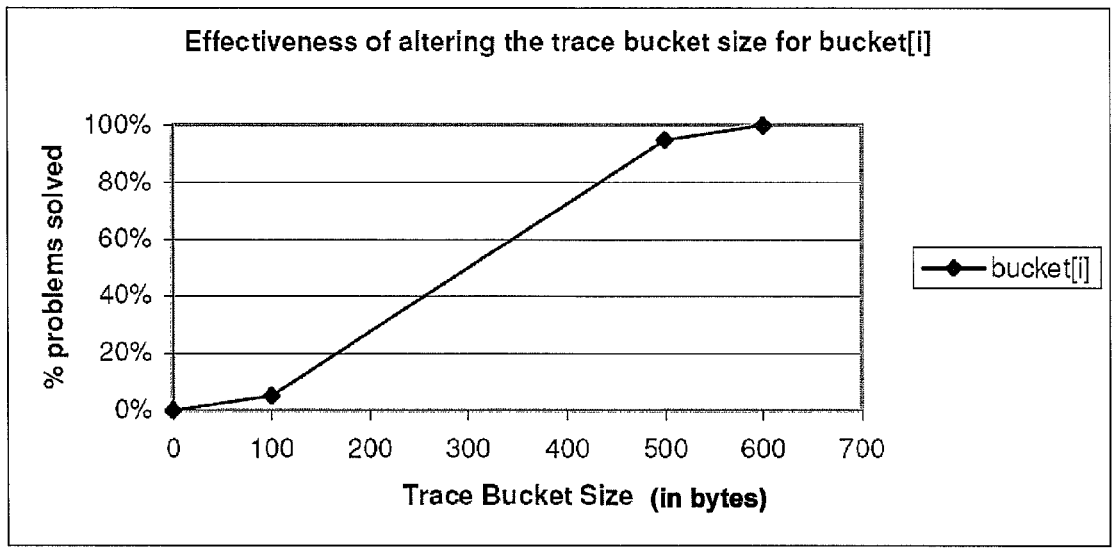
FIG. 3C illustrates, in a graph, percentage of problems solved as a function of bucket size.
Figure 3D:
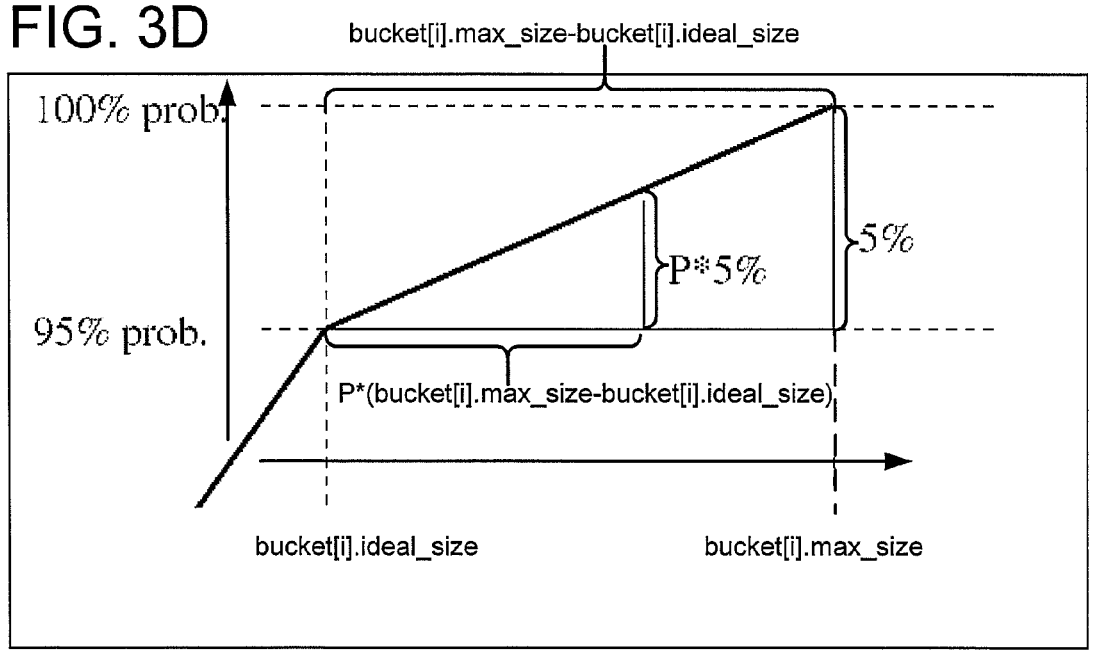
FIG. 3D illustrates an enlarged portion of the graph of FIG. 3C.

If in act 331, all bucket targets have been reached for a current stage then computer 190 exits the current stage, and moves onto a next stage if any. If in act 333 within a stage there is not enough memory to give a min-unsatisfied target difference to all unsatisfied buckets, then computer 190 progresses to a fair distribution phase in operation 323. In this phase, all unsatisfied buckets are allocated the remaining memory based upon a percentage of probability of solving a problem within each of software programs A . . . I . . . Z that is shared across all buckets. This percentage is also referred to herein as the effectiveness percentage and is illustrated on the Y axis (i.e. the vertical axis) in the graphs of FIGS. 3C and 3D.

All buckets receive enough memory to achieve the same gain in debugging effectiveness (as measured on the Y axis in graphs of FIGS. 3C and 3D), and utilize all the remaining memory.

Once all the memory has been consumed or all the stage targets are met, the memory allocation method proceeds to update the amount of memory allocated to each bucket. During the memory allocation method, the actual allocation amounts are just recorded in memory 1106. After the memory allocation method of FIG. 3B completes, the actual buckets used by UTS are grown or shrunk, based upon their newly calculated target sizes.

One illustrative implementation of memory allocation implemented by UTS is described next. In this illustrative implementation, UTS allows clients (e.g. programs A . . . I . . . Z) to direct their traces to different buckets. A bucket is a set of trace buffers into which the client's trace elements are stored. A trace buffer is a contiguous region in memory 1106 of computer 190. No concurrency control is provided for writing into buckets, therefore clients make sure that only one thread is writing into the bucket at a time. Clients can write trace elements from different components into the same bucket. Each trace buffer begins with a header with the following information: (1) trace buffer size; (2) current offset into the trace buffer; (3) link to next and previous trace buffer. All buckets have a common set of creation parameters: (1) creator cid—the component creating the bucket; (2) name—a string identifying the bucket; this name is written when a bucket is dumped; (3) user attributes—to further identify the bucket flags—to specify default options (a) by default records written should contain a timestamp; and (b) by default records written should contain global sequence number.

Buckets also have the following properties: (1) current buffer—A pointer to the current trace buffer being written to; (2) trace buffer list—A list of trace buffers allocated to that bucket; (3) current bucket size—summation of the sizes of all the trace buffers allocated to the bucket; (4) pool pointer—for buckets that allocate from a pool this is the pointer to the pool; (5) target bucket size—the target size to which the bucket should grow or shrink; this is only supported for pool-backed buckets; the resize bucket operation attempts to resize a bucket to the target bucket size; (6) write locked: if a bucket is locked all tracing operations involving the bucket (e.g. recording new traces, etc.) are not permitted. In some implementations trace pool buckets are locked and un-locked automatically for efficient memory management (for more information see the memory distribution section).

There are a set of functions in UTS that developers may invoke on all buckets: (1) destroy—destroys the bucket; the destroy operation is bucket specific; for some buckets this may be a no-op for other buckets this may free all the trace buffers associated with the bucket and free the bucket header; (2) dump—to dump the contents of a bucket. The bucket dump has a UTS header containing information about the bucket and a footer to mark the end of the bucket dump; (3) iterate—iterates the trace elements of a bucket; (4) reset—the contents of the bucket are reset; a subsequent bucket dump or iteration only includes trace elements that were recorded after the reset; (5) resize—resizes the number of trace buffers a bucket has; depending on the type of bucket this may or may not have an effect; there is also a default bucket that can be specified per thread of execution; the APIs of UTS are used to efficiently set and retrieve the default bucket; also the tracing infrastructure transparently records traces into the default bucket in two cases: (a) if there is a problem dynamically allocating trace buffers for a bucket and the bucket has no other trace buffers, then traces are automatically redirected to the default bucket; and (b) if a bucket is write locked then traces are redirected to the default bucket.

In the illustrative implementation, there are four bucket types: (a) embedded buckets; (b) heap backed buckets; (c) allocator call back buckets; and (d) UTS memory pool buckets. Each of these four types of buckets is discussed next. Embedded buckets are buckets that are embedded in a chunk of client provided memory. Part of the memory is used to store bucket meta data. The remainder of the memory is used to store trace elements. Primary use case: Clients that want to record information each time a state object is manipulated can embed a bucket inside the state object. Different processes can manipulate the same state object and therefore each serialized manipulation can be recorded in the embedded bucket. By using an embedded bucket, the last N state manipulations are always in memory and can be dumped when an error happens. Creation parameters: (i) a buffer—this is where the trace elements are stored; and (ii) the buffer size. UTS functions enable clients to know what the minimum buffer size is to store an embedded bucket; the buffer size must be large enough to contain the bucket meta data. The UTS resize bucket operation has no effect on this bucket type.

A heap backed-bucket is a bucket that obtains its memory from a client specified heap. Primary use case: In situations where trace elements are only useful for the duration of an operation, a heap can be allocated for the duration of the operation and trace elements can be stored in it via a heap backed bucket. At the end of the successful completion of the operation the heap can be destroyed. If an error happens during the operation, the bucket with trace elements is dumped. Creation parameters: (i) heap—this heap is used to dynamically allocate the trace buffer; (ii) initial trace buffer allocation size; (iii) trace buffer incremental growth amount; (iv) trace buffer max size; (v) chunk allocation comment; and (vi) chunk flags.

UTS allocates trace buffers automatically based upon the above parameters. This means that the allocations may happen during client write trace calls. The UTS resize bucket operation allocates or free from the heap.

An allocator callback bucket is a bucket that obtains its memory from client specified memory callbacks. Primary use case: The use case is the same as the heap backed buckets. Heaps require too much initialization to be used by generic clients therefore this provides those clients with an alternative. Creation parameters: (i) allocation callback; (ii) deallocation callback; (iii) initial trace buffer allocation size; (iv) trace buffer incremental growth amount; (v) trace buffer max size. UTS allocates trace buffers automatically based upon the above parameters. This means that the allocations may happen during client write trace calls. The UTS resize bucket operation calls the allocation or deallocation callback on trace buffers.

Memory pool buckets get their trace buffers from a UTS memory pool. UTS memory pools provide an interface by which clients can either do simple or sophisticated memory management for buckets. UTS has its own efficient trace pool implementation to maximize problems solved as illustrated in FIGS. 3A and 3B. This pool is also referred to below as UTS Maximum Problems Solved trace pool (abbreviated "UTSMPS"). Also, heap backed buckets and allocator callback buckets are implemented by UTS creating a pool that encapsulates the heap or allocator callbacks. UTS memory pools have the following properties: (1) pool resize callback is where clients specify a target size for the pool to grow or shrink to; some pools may require time to grow or shrink. Some pools may not support resizing; (2) pool destruction callback frees all the memory that the pool allocated; (3) bucket creation callback; this callback returns a bucket which is allocated by the pool.

Allowing the pool to allocate the bucket is good since it reduces the risk of metadata corruption that can happen with embedded buckets and it also removes the burden from clients to safely allocate the memory for the bucket; the bucket creation callback takes the standard bucket attributes plus the following attributes: (a) initial size—the initial size of the bucket (the summation of the sizes of all trace buffers allocated to a bucket); (b) min size—pool specific; for embedded and allocator cb buckets this equals the initial size; (c) ideal size—pool specific; for embedded and allocator cb buckets this is ignored; (d) max size—the maximum size of the bucket; (4) bucket deletion callback: frees the bucket and all trace buffers associated with the bucket; (5) bucket resize callback: attempts to free or acquire trace buffers in order to meet the target bucket size.

The above pool callbacks are used to implement the efficient UTS trace pool as described below. The trace pool is broken up into buffers of size 1 Kbytes. All the buffers will be used as trace buffers that will be allocated to UTSMPS trace pool buckets. Since the trace buffer size is fixed, this implies that a bucket with even one trace record allocates 1 Kbytes of memory. It is not expected however for too many trace pool buckets to require less than 1 Kbytes of memory.

In order to manage the pool effectively, the UTSMPS pool implements the following translation of the pool bucket creation attributes. Initial size is how big the trace buffer for the bucket is at bucket creation time. If a bucket can not be created with this bucket size an error is raised. The initial size has to be greater than or equal to the min size if it is non-zero. Buckets are shrunk to the minimum size if the UTS detects that a bucket is idle. Details on when a bucket is considered idle are discussed below.

When cold trace data is not important then clients specify a value of 0 for the minimum size parameter. If only the last N traces are important when the trace data is cold, clients specify a small value for min size that holds those last N trace elements. If cold trace data is as important as hot trace data clients specify the same value as ideal size for this parameter. Ideal size is the size of trace buffers with which the bucket creator (i.e. software developer, or user) is able to debug 95% of the problems he/she is debugging with the trace elements written into the bucket. Max size is the size with which the bucket creator should be able to debug 100% of the problems he/she is debugging with the trace elements written into the bucket. Unlimited is an allowable value for max size.

The details on how these parameters are used to effectively distribute memory are discussed next. At trace pool initialization time the UTS reserves memory and creates per-process buckets. Each process registers its per-process bucket as the default bucket for that process. This default bucket is fairly large (e.g. 1 Megabyte) so that it can be effective even if multiple components (in a process) with varying amounts of verbosity use this bucket for tracing.

One significant way to improve memory management is to increase the number of trace buffers for buckets that are in use and take away trace buffers from buckets that haven't been used in a while. For this reason UTS uses the concept of an idle bucket. A bucket is considered idle if more than N seconds have elapsed since the bucket was written to. N is configurable but by default N is set to 30 seconds. At every write call the UTS stores into the bucket a cached timer value from a variable that is updated every 3 seconds by a dedicated process In this way even if timestamps are disabled by the tracing clients at every write trace call the UTS is still able to approximately calculate when the bucket was last written into and therefore if a bucket is idle. If a bucket is idle, when the memory distribution method is run, the ideal and max size parameters are set to the min size for the purpose of the memory distribution method. When a bucket has been idle for a very long period of time, say 10 minutes, some embodiments shrink the bucket size to a single trace buffer or to size 0. The draw back to this approach is if clients start using the bucket again or if an error happens the last N traces will no longer be available.

A memory distribution method (also called "algorithm", "distribution algorithm" or "memory distribution algorithm") is described in detail below, initially for the steady state, followed by a description of edge cases like a flood of processes connecting. The bucket attributes the memory distribution algorithm considers are the min size, ideal size, and max size. Terminology: (1) bucket[i]: refers to a specific bucket; (2) bucket[i].allocation_size: at the start of stage 1 this is initialized to 0; at the end of the distribution algorithm this contains the target size for the bucket. (3) bucket[i].allocation_size_stage_start: caches the allocation_size value for the bucket at the start of a stage; (4) bucket[i].min_size: the min parameter for the bucket; (5) bucket[i].ideal_size: tha ideal size parameter for the bucket; (6) bucket[i].max_size: the max size parameter for the bucket.

The memory distribution algorithm is composed of two steps per stage. The first step, maximum target satisfaction, tries to maximize the number of buckets that reach their per bucket target for that step. For every bucket that did not achieve its per bucket target, the second step, fair distribution, distributes memory fairly among them. The UTS only goes from one stage to the next stage if all the buckets have achieved their targets in a given stage. The stages for memory distribution are as follows: stage 1: per bucket target=min_size; stage 2: per bucket target=ideal_size; stage 3: per bucket target=max_size. To provide a concrete understanding, while explaining the steps assume that UTS is currently in stage 1, where the target is the per bucket minimum size. The maximum target satisfaction step is conceptually done in phases.

The first phase of the target satisfaction step takes all buckets and computes the minimum of the stage target. For stage 1 the UTS takes the minimum of the minimum size target of all the buckets. phase_1_min=INTEGER_MAXVAL; this is the integer maximum value. For a 32 bit integer the maximum value is (2 to the power 32)−1. for (i=0; i<N; i++) phase_1_min=min(phase_1_min, bucket[i].min_size). UTS then allocates that much memory to every bucket. for (i=0; i<N; i++) bucket[i].allocation_size+=phase_1_min;

The second phase of the target satisfaction step then takes the minimum of the difference between the minimum size of bucket[i] and the amount already allocated to bucket[i] for all buckets that haven't already been allocated their minimum target.

```
phase_2_min = INTEGER_MAXVAL;
for (i=0; i<N; i++)
    if (bucket[i].min_size − bucket[i].allocation_size > 0)
        phase_2_min = min(phase_2_min, bucket[i].min_size − bucket[i].allocation_size)
```

This memory is allocated to all bucket[i]'s that have not yet met their minimum target. for (i=0; i<N; i++)

```
        if (bucket[i].min_size - bucket[i].allocation_size > 0)
            bucket[i].allocation_size += phase_2_min;
And so on.
phase_[i]_min = INTEGER_MAXVAL;
for (i=0; i<N; i++)
    if (bucket[i].[target]_size - bucket[i].allocation_size > 0)
        phase_[i]_min = min(phase_[i]_min, bucket[i].[target]_size -
        bucket[i].allocation_size)
for (i=0; i<N; i++)
    if (bucket[i].[target]_size - bucket[i].allocation_size > 0)
        bucket[i].allocation_size += phase_[i]_min;
```

If at any phase there is not enough free memory to distribute the phase minimum to all buckets then UTS stops the maximum target satisfaction step and shift to the fair distribution step. The fair distribution step first computes the amount of memory it needs to distribute. It computes this by summing the allocation size of every bucket that hasn't met its target to the amount of unallocated memory.

```
    free_memory_total = unallocated_memory;
    for (i=0; i<N; i++)
    if (bucket[i].min_size - bucket[i].allocation_size > 0)
        {
        free_memory_total += bucket[i].allocation_size;
        bucket[i].allocation_size = 0;
        }
```

The fairness mechanism that is used by UTS makes sure each bucket received the same percentage of memory, P.
P=bucket[i].allocation_size/bucket[i].minimum_size  Σ bucket[i].allocation_size=free_memory_total;
Σ bucket[i].minimum_size*P=Σbucket[i].allocation_size
P=free_memory_total/S bucket[i].minimum_size;
bucket[i].allocation_size=free_memory_total*(bucket[i].minimum_size/Σ bucket[i].minimum_size);

For stages 2 and 3, in the fair distribution step, the UTS only redistributes allocations made within the stage. Thus, whatever was allocated in a previous stage to a bucket remains allocated to that bucket.

```
free_memory_total = unallocated_memory;
for (i=0; i<N; i++)
if (bucket[i].[target]_size - bucket[i].allocation_size > 0)
    {
    free_memory_total += (bucket[i].allocation_size -
    bucket[i].allocation_size_stage_start);
    bucket[i].allocation_size = bucket[i].allocation_size_stage_start;
    }
```

Furthermore, instead of using the ratios of the stage targets, the UTS uses the ratios of the difference between the prior stage target size and the current stage target size to distribute the memory. This is because any memory allocated in a prior stage is not released in the following stage.
    bucket[i].allocation_size+=free_memory_total*((bucket[i].[target]_size−bucket[i].[target prev stage]_size)/Σ (bucket[i].[target]_size−bucket[i].[target prev stage]_size));

In stage 3, where the per bucket target, max size, could be infinite, in the fair distribution step the UTS treats the target as the maximum of the non infinite buckets that didn't reach their target. If only buckets with infinite max size didn't reach their target, then UTS uses the ideal size ratio to distribute the remaining memory bucket[i].allocation_size+=free_memory_total*(bucket[i].ideal_size/Σ bucket[i].ideal_size);

Conceptually the UTS is using the min, ideal, and max sizes to graph an effectiveness curve as shown in the table below and illustrated in FIG. 3B.

| bucket[i] | | Effectiveness |
|---|---|---|
| Min | 100 | 5% - component specific percentage |
| Ideal | 500 | 95% |
| Max | 600 | 100% |

A staging part of the method ensures that before any bucket achieves ideal effectiveness, all buckets must reach minimum effectiveness. Similarly before any bucket achieves maximum effectiveness, all buckets must reach ideal effectiveness [Note: this explanation assumes min<ideal<max]. Another reason why the fair distribution step redistributes the memory based on percentages between the current stage target and the previous stage target is that all buckets realize the same percentage gain in effectiveness (% problems solved). This is only true in the stages where the current stage target and prior stage target have concrete effectiveness percentages; thus for us this is true in stage 3. In some embodiments, the reason why the above-described method works out is because all buckets in such stages climb the same number of percentage points between the stage targets; from stage 2 to 3 the percentage gain for all buckets is 5% in effectiveness. Therefore if the UTS allocates the same percentage of memory to all buckets, then by similar triangles all buckets realize the same gain in effectiveness.

Assume that % problems solved for the min target is a small number that is similar for all buckets then the equal % effectiveness gain argument can be made for all stages. To summarize, this method of memory allocation assumes that each bucket is tracking a possible source of problems. All buckets are tracking equally important sources of problems and each problem source has the same probability of generating an error. A staging part of the memory allocation method tries to guarantee that each problem source has some stage target amount debuggability. For buckets that are small, users specify the same value for all the stage targets, thus small buckets immediately achieve complete effectiveness.

Other embodiments use a memory allocation method where the memory is continuously divided equally amongst all buckets that still required memory ignoring the stage targets, however such a method allows some problem sources to have complete debuggability and others to have less than the minimum amount of debuggability. This defeats the goal of making sure all problem sources are debuggable. The reason why the first part of the stage memory allocation method attempts to maximize the number of buckets that meet the stage target is because the UTS can not trust that in reality the effectiveness curve is linear between stage targets. Therefore some embodiments make no assumptions and satisfy the stage targets that the user explicitly specified.

The stage targets are in effect exact points on the effectiveness curve whereas a linear interpolation that the UTS does between stages is a guess on what the curve looks like. Lastly, as already explained, the goal of the fair distribution step is to equally increase the number of problems that can be solved for each problem source. Thus this memory distribution method enables all problem sources to record traces to memory and also maximizes the number of problems that can be solved. The algorithms described above of some embodiments are not as optimal as they could be, depending on which aspect is to be optimized in a given embodiment. One mechanism to make a memory distribution method more optimal is to have a histogram per bucket configuration i.e. count how many buckets have the same min, ideal, and max values. Also, some memory distribution methods avoid situations where buckets keep growing and shrinking when only small amounts of memory become available or unavailable by use of thresholds as follows.

Certain embodiments set thresholds to make sure that a bucket only grows when the UTS is significantly increasing (e.g. increasing by more than 5%) the effectiveness of a bucket (or other buckets) or decreasing memory utilization significantly (e.g. more than 1 MB) since memory in the pool can be used by other buckets only when it is freed by existing buckets. Optimizations like these are applied in various embodiments, depending on experimental data. Example UTSMPS trace pool bucket clients: a) A process that spawns other processes allocates a bucket for the spawn layer codepath traces. initial=min=ideal=2 k: to obtain at least the trace elements for the last few spawns. max=10 k: to debug any process spawning issue more than this many traces are not required. b) A process uses the trace bucket to record information for its last operation. That last operation always takes 100 k of trace memory to record. Accordingly, initial=min=ideal=max=100 k.

Two issues with the above-described approach: (1) UTS does not factor in the relative importance of different components. If a list of top 10 problematic components is known, for those components their buckets are made relatively bigger than other buckets so that the software developer has information to debug the components. Some embodiments do not use such a list, i.e. treat known problematic components same as other components. (2) UTS does not set per-process or per-session caps. If one process allocates a hundred buckets and another allocates only one bucket all with the same parameters then the process with the hundred buckets gets a larger share of memory. The process that has a hundred buckets is probably tracing in more layers and thus appropriately gets extra trace buffers in case any of those layers fail.

Highlights of the above-described approach: (1) If two buckets with the same parameters are active for the same time period but one is written to twice as many times as the other, then that bucket does not get twice as many trace buffers. Trace buffers are sized based on bucket creation parameters not based on frequency of writes.

Performance of computer 190 is an important goal of some embodiments, and to minimize overhead from executing a memory distribution method, such embodiments use only one process (e.g. a trace pool management process) to run the memory distribution method. Furthermore, the trace pool management process runs the memory distribution method periodically, e.g. once every 3 minutes (configurable). At the end of the memory distribution method the trace pool management process will have computed a target size for each bucket. To ensure high performance, when processes write trace elements to buckets the processes do not get locks in some embodiments. Thus, the trace pool management process of such embodiments does not itself redistribute trace buffers assigned to buckets because they may be accessed concurrently by threads storing traces. Therefore, to efficiently distribute memory without requiring a lock at every trace call, UTS creates two UTSMPS trace pools as follows: a process owned bucket pool and a non-process owned bucket pool. These two pools are described next.

Buckets created from a process owned bucket pool are owned by the process that called the create bucket routine. Buckets created from the process owned pool are added to a per process list of buckets. In this way if one of software programs A . . . I . . . Z fails to destroy a bucket for any reason, UTS automatically destroys it and conditionally asserts. The technique in which the memory associated with a bucket from this pool is distributed depends on if the process is idle (no top call pushed). Active process memory distribution: When a bucket requires resizing, the trace pool management process will modify the bucket header to set the target size and will also set a bit in the process that owns the bucket. This bit will be checked for periodically by the process owning the bucket.

When a process detects this bit is set, the process iterates through its process-owned buckets and try to resize them if the current size does not equal the target size. If it is not possible, say there is not enough free memory, the process will give up and wait for his bit to be set again by trace pool management process. Idle process memory distribution: UTS considers a process idle if it does not have a top-call. UTS gets a lock (or leverage an existing one) at topcall push and pop to mark that a process is idle or not-idle. If a process is idle, the trace pool manager gets the lock to prevent the process from becoming active and then resize the idle process's buckets. The assumption made here is that an idle process should not write to a process owned bucket when it is idle, as discussed elsewhere herein.

To handle the case where buckets are in a shared global area (SGA) of an application (such as a relational database), and can be shared by multiple processes of the application, UTS creates a second type of trace pool. Clients specify two callbacks when creating buckets from this pool: a) obtain bucket ownership callback: the trace pool management process invokes this to take ownership of the bucket. The callback takes a timeout parameter so that if ownership can not be obtained in the time specified the callback should give up on trying to obtain ownership and return that it was unable to obtain ownership. b) free bucket ownership callback: To release ownership of the bucket. Once the trace pool management process takes ownership of the bucket it can then proceed to resize the bucket. At SGA deletion time the UTS asserts an error if any non-process owned buckets still exist.

The motivation to use the first type of pool is to have process scoped ownership is because a process is the minimum requirement for acquiring memory from the trace pool (without a process state object you can not acquire a lock) and because a process represents a thread of execution such that when a process is idle it no longer records any trace elements.

The motivation to use the top-call push pop boundary as the boundary when a process is marked idle or active is because it is a boundary where it is safe to get locks and it is not far in time from where a process would truly become idle for example by waiting for the next SQL statement/call from the client.

The following description relates to an issue of what happens when a process writes into a process-owned bucket when the process is marked idle/the top call is popped. This situation is quite rare for most components of a process, because most components are only accessed once a top-call is pushed. However to handle this case the UTS uses the concept of write locking of buckets. Specifically, prior to a process being marked as idle, all process owned buckets for that process are marked write locked (process owned buckets point to a per-process variable that is set to locked or unlocked), and once the process has become active the UTS marks all buckets unlocked. As stated elsewhere herein, when a bucket is write locked all traces are redirected to the default bucket.

However, the UTS default bucket is also a process owned bucket and therefore it is marked write locked. Certain embodiments make the default bucket non-resizable by creating an embedded bucket and carving out the trace buffers from the trace pool. However since the per-process default bucket can be fairly large (1 meg) several embodiments make sure that the trace buffers can be reclaimed if the process is idle, and therefore create a secondary default bucket at process creation time of size 1 k from the SGA. This is an embedded bucket (e.g. embedded in a process state object) so it does not grow or shrink. Prior to marking a process idle the UTS changes the per-process default bucket to this smaller secondary per-process default bucket. Since this bucket is not write locked the UTS is able to record traces into it in the rare case that a write locked bucket is written to when the process is idle. When the UTS marks the process active, it changes the per process default bucket back to the larger resizable per-process bucket. FIG. 3E illustrates how trace elements get redirected when a process is marked idle.

In some embodiments, a software developer is provided with the ability to configure the total trace pool size. The UTS frees/allocates granules from/to the shared region of memory. A shrink operation takes time. Until all processes have responded to the request to shrink their trace buffers enough so that the memory can be freed, the trace buffers are not freed. Some embodiments also address granule fragmentation. But since there is a central memory manager in certain embodiments, it is only a matter of time before the shrink is successful (worst case scenario some process may have to shrink more than they should have had to normally and then re-grow so their buffers are not allocated on the granule that the trace pool manager is trying to free). Also, as discussed elsewhere, via alter system commands a database administrator ("dba") can manually claim buffers inside the trace pool for problem specific tracing. This memory is freed by an alter system command.

If the trace buffers for the bucket aren't allocated at bucket creation time, then when the first trace record is stored into the bucket the bucket is created with a trace buffer of ideal size or if there is not enough memory for this then the minimum size is used. If there is not enough memory to create a bucket of minimum size, then trace record is temporarily redirected to the default bucket. Note that this implies that in the case where a client creates a bucket with an initial size of 0, when the UTS records a first trace record into a bucket, the UTS needs to get a lock to get the trace buffers for the bucket. Also note that creating an UTSMPS trace pool bucket involves getting locks in some embodiments. Thus, it is not something that is done frequently. To avoid the overhead of bucket creation one can create buckets when a notifier is fired.

Because UTSMPS trace pool buckets require locks for creation and deletion, UTSMPS trace pool buckets can only be created/deleted by a process with a process state object. If tracing is required prior to process state object creation or after process state object deletion, clients use two buckets. One should be an embedded bucket with a chunk of memory that is used before PSO creation and after PSO deletion. The just-described chunk of memory may be in process private memory called Process Global Area ("PGA") of an application (such as a relational database of the type available from Oracle Corporation). The other should be an UTSMPS trace pool bucket. If an error happens then the client makes sure to dump both buckets if they exist. There is an edge case of what if an error happens after UTSMPS trace pool bucket is deleted, but in that case the assumption is that in most cases the traces in the UTSMPS trace pool bucket will not be helpful anyways.

To manage traces, UTS of some embodiments provides a more flexible size limit for trace files. The UTS of some embodiments allows a trace to span multiple (partitioned) files, with a maximum limit on each file fragment. Each process or thread's trace file is allowed a maximum of N fragments. The UTS of certain embodiments also supports a rollover capability where the oldest file will be replaced after the Nth fragments has been created. In a normal case, UTS trace files are stored inside of a repository (also called "ADR") in storage device 1110. For example, in some embodiments, each repository 207 has a subdirectory, named TRACE, designated for storing UTS trace files. When writing UTS traces to disk, each process/thread writes to its own trace file, mainly for avoiding concurrency issues. When an incident occurs, UTS in-memory traces will be dumped with other incident dumps (e.g. stack traces, state object dumps) to disk. The output dump file is stored in a dedicated subdirectory named after the Incident ID in the current ADR Home. The incident subdirectory is named: <adr_home>/INCIDENT/INC<inc#>.

In addition to the Incident dump file, UTS also writes a "stub" (i.e. a record with the Incident dump file name) of the newly created Incident file into a regular trace file in the TRACE directory. If a trace file for the current thread already exists, the Incident record is added to the trace file. Otherwise, the Incident record is added to a new trace file.

Some embodiments use a Trace ID, which can be specified by a software developer (also called "user") when invoking a function in the API of UTS, to generate traces. The Trace ID can then be used later on to identify trace files, as well as retrieving contents within trace files. In some embodiments, a Trace ID marks a time range within Which traces are generated. The following presents a rough design sketch of how it works in a user environment: 1. A relation in a repository (e.g. table in a database), Trace_Id_Info, is added to the repository. This table keeps track of identifiers of traces (Trace IDs) that have been generated in the system. At the minimum, it has the following fields: (Trace_id, Begin_Time, End_Time, Session_id). 2. UTS/ADR provides a command for users to create a Trace ID. An example of the command that a software developer enters is as follows:

```
ALTER SYSTEM START TRACE NAME="foo";
-- Turn ON tracing
-- execute workload to be traced
-- turn OFF tracing
ALTER SYSTEM END TRACE.
```

In some embodiments, users issue a "START TRACE . . . " command before turning ON tracing. This action causes a new record for "foo" to be added to the Trace_Id_Info relation. This new record has the correct Begin_Time and the Session_id values. For example, (Foo, 12:30 pm, NULL, session=10/serial=1234). Users turn ON tracing, followed by executing some workload to produce the target traces. When the users decide that enough traces have been collected, they will turn OFF Tracing, and at the same time will issue the "ALTER SYSTEM END TRACE" command to signal the end of the Trace_Id timeframe. Doing this causes an update to the "foo" row in the Trace_ID_Relation table, updating the End_Time field. (Foo, 12:30 pm, 12:45 pm, session=10/serial=1234)

When a user wants to identify the target trace files for "foo", the user can invoke a function in an API of repository 207 to retrieve the list of trace files associated with the Trace ID. The repository's API looks up the Trace_Id_Relation table for the "foo" entry. With the time range of "foo", the repository locates the relevant trace files by logically performing an "ls-rt" type of commands on the list of trace files in the repository DUMP directory. For example, the repository of some embodiments uses the File→CreateTime and File→LastUpdateTime to perform the following check on each file: If ((File→CreateTime<=Trace_Id→EndTime) &&

(File→LastUpdateTime>=Trace_id→BegTime)) Choose_This_File(File). When the contents of the files are examined, the UTS of some embodiments ensures that the trace files are sprayed with wall clock timestamps. With the time range for the specified Trace ID, the repository (i.e. ADR) is able to retrieve the relevant sections of the trace files, to be returned to the users.

UTS of some embodiments implements a Trace Header. To improve the quality of searches on the contents of trace files, the UTS adds the following tags to an existing end-to-end trace header in trace and dump files: ECID="xyz" and Trace_Id="foo." This allows a Viewer, to locate traces by ECID and Trace_Id.

UTS of several embodiments performs Trace File Size Management as follows. A partitioning scheme is used for trace files. There are several motivations for organizing trace files this way: [1] Make sure trace file sizes are manageable when viewed by popular editors like Emacs or VI. Trace files that are GBs in size are sometimes problematic to browse. Some embodiments are implemented with the assumption that a file size less than 100 MB would not pose any problems to the tools. [2] Prevent run-away dumping/tracing—occasionally (but rarely), some piece of code may misbehave and generate an unusually amount of traces. Some embodiments of UTS prevent such occurrences from having a crippling effect on a system writing alert messages or generating incidents. Specifically, UTS imposes a maximum size for each trace file. [3] Remove old traces within a process trace file—some background process can hang around for a very long time and their individual trace files can grow to be quite big. Though the older portions of a trace file have become not very interesting, there is no easy way to get rid of them. If one imposes a maximum size for trace files, such background processes may eventually hit them and stop tracing altogether. This is not very desirable as new traces or dumps are most likely more valuable than old one. Hence, the UTS uses a wrapping scheme to allow the process to overwrite its older traces, without paying large penalties.

In this scheme, each trace file is partitioned into one or more actual files. The name of each file partition (of the same trace file) uses name prefix, with a "_P<part#>" suffix. For example, the RDBMS has trace file names like: "gndb1_ora_12345_p3.trc". Each partition has a UTS-determined size limit, around 100 MB. When a partition size is reached, a new partition is created for the trace file. Note that most files have only one partition, as they most likely do not exceed the 100 MB limit. For ease-of-use, the first partition uses a NULL string as the "P<Part#>" suffix as their name.

This scheme uses a wrapping policy—to prevent runaway traces, UTS chooses a default Max size for individual trace files. In some embodiments, UTS picks a policy of (10% of Max Repository Home size). If the Max Repository Home size is unlimited, then the Trace file size is also unlimited. Logically, when the total trace file size reaches it limit, old traces are overwritten by new traces. Some embodiments create a new partition, and drop the oldest partition.

This scheme also performs auto-purging of repository 207—by default the repository supports auto-purging of old trace files. For example, trace files, and trace partitions that are older than one month are automatically be removed from the repository.

For commands that generate one-time dumps, some embodiments enhance the Dump command to allow a Trace_ID to be specified. This is just to address a small user interface issue, where users are able to use a single command, instead of having to type three separate commands.

On-disk format is the format specification for storing UTS traces on disk. At the high level, traces on disk consist of client data and UTS metadata. The data portion, for example the free form payload or data blobs (dump bodies), is specified by UTS clients and is left as is by UTS. To the client portion, UTS appends the metadata portion, which is transparently managed by UTS and provides information for recognizing trace structures.

The following description introduces the on-disk format for attributes and trace elements. Sections and dumps are nothing special but using special trace elements to mark the beginning and end of sections and dumps. Hence UTS does not introduce any new format except that the special tags in the trace elements. Attributes are classified into native attributes and user-define attributes, and native attributes are written implicitly by UTS, hence the UTS uses two different formats for them. When an attribute appears in the payload, UTS only keeps a reference of this attribute in its metadata. The attribute reference is a relative offset in the payload where the attribute starts and the total length of the attribute.

To address performance concerns, trace elements are formatted by UTS of some embodiments when they are dumped to disks. For the on-disk trace record, the format contains several portions: (1) Freeform payload: It is user-input tracing information; (2) Separator for data and metadata portion of a trace record; (3) Separator among different trace records. UTS need to determine the trace record boundaries. UTS introduces the following mechanism: new-line character and the number of lines a trace record spans. The number of lines is needed since the payload portion can contain multiple lines. (4) Tags for differentiating different type of trace records. Trace records are classified into different types based on their types: trace record, section, and dump. Section trace records are the ones for begin and end section trace records. Dump trace records are the ones for begin and end dump trace records. They are used for parsing trace structures, hence UTS introduces metadata to differentiate them.

UTS uses the following keys (also called symbols) in the metadata of a trace record to identify the type: (a) TR: normal trace record type trace elements; (b) BS: begin section trace elements; (c) ES: end section trace elements; (d) BD: begin dump trace elements; (e) ED: end dump trace elements. For example: uts_rec3( . . . , "Send % d bytes to % (slvnum) using mode=stream", nbytes, UTSATTR2(UTS_ATTR_SLV, slaveNo)) Assume nbytes=100, slaveNo=1234, attribute name for slave number of "SLAVEID" the trace record on disk appears as shown in FIG. 1A.

Notice that the above format is simple enough that a software developer can still read and easily interpret a raw trace file, even though the recommended way to do this is to use a viewer. UTS metadata can even be stripped with a simple sed command to restore the original trace file content, the way it was prior to UTS: sed-e 's/\$#\$#.*//p'<ora_xxx.trc The decision to write or not a trace element to memory and/or to disk is made by UTS considering two inputs. One input comes from the developer who is responsible to define the out-of-the-box or default policy. This policy is specified directly via parameters/flags passed to the write trace call. The second input comes from the DBA (or support/performance analyst) when there is a need to modify the default policy. This is what is referred later as reactive control. As said earlier, the default policy for tracing is decided by the client of the UTS service and directly specified in the write trace call. Often, this policy is determined statically and does not change at run-time. But this is not necessarily the only way. In some embodiments, UTS clients have their own specific ways to extend the default UTS tracing control, even if this is not really the recommended way.

Default control for memory and disk channels are defined independently. For memory, potential settings are:—Off: do not write by default this trace element to memory.—On: the trace element should be written in the memory bucket specified by the caller in the write trace call. Setting for the disk channel is similar, basically:—Off: do not write by default this trace element to disk.—On: the trace element must be written to disk (this will be rarely set by default). To simplify the write trace call interface, the caller does not specify the exact trace file used for the write. Generally, how to write a trace element to disk and where to write it is defined when UTS is configured.

In some embodiments, UTS enables developers to specify directly the subset of in-memory, and even on-disk traces which are enabled by default. Depending on the embodiment, the UTS also provides support to externally control and alter this default tracing policy. In some embodiments, UTS handles five typical scenarios where overwriting or modifying the default setting can happen as follows.

A first scenario relates to benchmarks: when running a benchmark (e.g. TPC-C), unnecessary overhead must be eliminated. Hence, a switch is supported to globally disable the default tracing, be it in memory or on-disk. For performance reason, this global switch takes precedence over any other kind of control, which means that exceptions for that switch cannot be defined (i.e. 100% off).

A second scenario relates to turning-off a run-away component: one key requirement for default tracing (which will be mostly done in-memory) is to have a limited overhead, say no more than 2% percent. The precise percentage is determined based on measurement and verification of this overhead using representative benchmarks and LRG tests. It is possible for such a UTS to miss a particular setting under which a component has a higher overhead. In this case, the workaround for a customer of computer 190 is to disable default tracing just for that component such that tracing diagnostics for other components are still available.

A third scenario relates to increasing tracing verbosity of a component: assuming that default tracing is not enough to debug an issue related to a particular component, some embodiments increase the tracing verbosity (or volume) of that faulty component such that the next time around, when the problem recurs, more traces from that component are dumped to debug the issue.

A fourth scenario relates to redirecting component in-memory traces to a dedicated bucket: redirecting a subset of the in-memory trace flow to a dedicated and potentially larger bucket is useful to increase the retention of those traces. For example, assume that the volume of traces generated by a (faulty) component represents 0.1% of the total volume of default in-memory traces. By redirecting these traces to a dedicated bucket, their retention is increased by a factor 1000 while the memory utilization is only increased by a factor 2, assuming that the default and the exception bucket have the same size. Note that redirecting a subset of the trace flow is often paired with increasing trace verbosity (see above point).

A fifth scenario relates to tracing a faulty operation: if an operation fails (e.g. internal or unexpected external error) or does not perform as expected (e.g. optimizer generates a suboptimal plan), a support analyst might ask the customer to fully trace that operation and send back the trace file. When this happens and if the timing is not an issue, on-disk tracing is enabled such that the entire trace data is made persistent. In some embodiments, control software for the UTS handles these five scenarios. If clients need anything more fancy (e.g. tracing all operation performed on a particular heap) or if they want to have their own way to control their tracing, they can implement their own logic and pass in the appropriate tracing flags.

Some embodiments of the UTS have a built-in control mechanism that is private to an execution thread, i.e. there is one control structure per thread. Two level of control are supported by UTS: (a) Global: a global switch is introduced to fully disable tracing, both in memory and on-disk, for the targeted thread. This global switch is simply implemented in some embodiments as a boolean variable residing in the per thread UTS context and these embodiments expose an API for control software 281 to manipulate this variable. (b) Component level: component level control allows for finer control granularity. The control unit is here a component and each component can be controlled independently by control software 281. The following type of control is supported: (1) disable: fully disable tracing for this component, both in-memory and ondisk; this is used as a work-around for bugs when default tracing has a too high overhead; (2) more in-memory tracing: increase the volume of in-memory tracing for that component up to the specified level; (3) more on-disk tracing: increase the volume of on-disk tracing for that component up to the specified level. (1) is exclusive with (2) and (3). Depending on the embodiment, (2) and (3) are exclusive.

Some embodiments make the just-described (2) and (3) exclusive to reduce the cost and complexity when checking if a particular trace is enabled. In certain embodiments, on the other hand, it might not be that bad and the advantage of supporting both independently is that one could potentially enable on-disk tracing for very low verbosity traces while using in-memory tracing for the rest (or a subset of it). Mixing both schemes is done by several embodiments since on-disk tracing is much more expensive but has an infinite retention while in-memory tracing is less expensive but has a finite retention. As a design note, the UTS control framework relies on a way to very quickly retrieve control information for a given "control key", which is in some embodiments the component id. A lookup mechanism is highly efficient in the negative case, i.e. when no control is set for the specified component id. The best way to test the negative case is to assume that UTS uses a bit vector to check whether or not control information has been set for a given component.

In some embodiments, developers use tracing levels in different ways. One way is to define the level as a set of bits, each bit controlling a different class (or set) of traces. Another mode is to use level as a way to control the trace volume, where setting the (volume) level at value N means that all traces which have been defined at a level less or equal to N must be produced. Some embodiments use this later definition of level since the first model can be easily implemented by defining a different component for each class of traces.

In several embodiments, two special volume levels are also defined by UTS:—Off (or disable): nothing is traced, including default tracing. This setting is used to disable tracing for a component.—Default: only traces enabled by default are produced. Note that this is the default behavior but this level is needed to return back to that behavior. It must be pointed out that this control scheme means that developers have to determine the level associated to each trace element they produce, be it a record, a section, or a dump. More concretely, the trace level is one parameter that must be passed-in to each write trace call.

In some embodiments, tracing is not globally disabled, and instead UTS determines if a trace element is eligible for tracing simply by looking at a default trace setting and the volume at which the component (which is writing the trace) is being traced. If the trace element is found to be eligible for tracing, it still can be rejected based on attribute filters. Attribute filters enable users to precisely filter out traces. UTS of some embodiments supports a Boolean expression (disjunction or conjunction). Generally, attributes targeted in a filter are attributes passed-in to the function producing the trace element. But the filter can also reference dynamic attributes, i.e. attributes whose value is returned by a callback function (e.g. pgadep here). Finally, in some embodiments filter conditions also reference attributes in parent sections. The trace element is rejected if a post trace filter is defined for the component producing the trace and if this filter evaluates to FALSE. Note that if an attribute referenced by a filter is unknown, the condition involving that attribute evaluates to FALSE (like NULL semantic in SQL).

Some embodiments of the UTS support bucket redirection as follows. For in-memory tracing, when a client produces a trace element, it also specifies a destination bucket where this trace element is to be written. This bucket is the default bucket for that trace element and is specified directly by passing a bucket handle to the UTS write trace function. To increase the in-memory retention of traces produced by a faulty component, it could be useful to transparently redirect the in-memory traces produced by this component to a dedicated and possibly larger bucket. For this purpose, UTS provides a way to register by name a bucket for a thread and then to redirect to this bucket in-memory traces produced by this thread on behalf of one or more components. Note that potentially more than one bucket can be registered using this mechanism and different components can be redirected to different buckets.

Another aspect of control is its scope. For example, an RDBMS software program may define two scopes: system and sessions. A goal is to define more scopes, mainly SQL (identified by a sql id) and database calls (identified by any session attribute). Generally, a scope defines a region of code where additional control can be added by the control infrastructure. Hence, control scopes are transparently managed and clients don't need to know about them: at scope boundaries, control information is modified if needed by the control infrastructure to account for the scope change.

An event type defines the nature of the control data retrieved by a client when it checks for an event number. For UTS, there is only one event type, named "TRACE", which has a volume (a number), a channel which identifies the type of storage media (memory or disk) and additional optional info (like redirection and attribute filters).

Generation of well-structured traces as done by UTS enables a common viewer across multiple software programs A . . . I . . . Z also enables navigation of traces in a structured manner. The viewer understands the structure of traces and provides common functionalities for viewing, searching, correlating, and processing trace data. For instance, the viewer can be instructed by a software developer (i.e. user) to filter trace elements on common keys (or attributes), such as components, subcomponents, and time ranges.

The viewer also has the capabilities to search on user defined attributes, such as sqlid and dba. Since traces are organized into different hierarchies (i.e., sections), the viewer navigates traces by hierarchies: before drilling down to details, the viewer can provide a higher-level view of traces, e.g., show trace map. Accordingly, a common viewer helps developers and support analysts save a lot of time to find relevant data which may be otherwise buried in the huge amount of trace data.

In addition, well-structured traces generated by UTS enable post-processing of traces in a programmatic manner, i.e. by software programs. Accordingly structured traces support diagnosability applications to mine trace information. Since UTS defines the trace structure, in some embodiments UTS also supplies a library or toolkit to provide basic functionalities to access and process a trace file (e.g. parsing, searching, basic functions to navigate and extract information).

Thanks to this toolkit, software developers (or DDR) build, with a limited effort, diagnostic tools to help solving specific classes of issues in software programs. For example, a group of developers of an RDBMS optimizer build a diagnostic tool to help in understanding why an execution plan is regressing. They do so by performing an intelligent diff of the optimizer trace to find/isolate the root cause of a plan change. The diff functionality can be built on top of the UTS trace access toolkit to free the developer from having to parse and navigate the trace data. Hence a trace viewer uses two parts: a front-end utility and a back-end toolkit, which are described elsewhere.

Trace access interfaces are the front end of trace viewer. Some embodiments include a diagnostic tool called a repository viewer, and the trace viewer is part of the repository viewer. A tool in computer 190 such as repository viewer 209 (FIG. 2B) supports two front-end interfaces: command-line interface and browser-based interface. Note that any type of viewer may be used, and the specific viewer is not a critical aspect of the invention.

The trace access toolkit provides APIs for accessing and post-processing trace files. These APIs facilitate other components for building tools that operating on trace data. This toolkit is a set of C-language Application Programming Interfaces or APIs. Both generic (repository viewer) or component specific (tkprof, optimizer diff, PQ hang analyzer, . . . ) diagnostic tools use this toolkit. Hence, defining and implementing this toolkit is an integral part of the UTS of some embodiments.

A trace viewer provides the following viewing functionalities in certain embodiments. Note that all functionalities allow users to specify attributes for filtering and correlating. (1) List trace files: provides ability for listing trace files satisfying attribute conditions; for example, find the trace files containing process state dumps. (2) Show the trace map of a trace file. The trace map of a trace file is the list of highlevel information of a trace file and allows users to locate the interesting sections quickly. The viewer provides the functionality for showing the trace map of a trace file. (3) Show trace elements of trace files. Since trace files can potentially contain huge amount of data, it is very important to help users to find the trace information they are interested in. The viewer provides functionalities to retrieve the trace elements users are interested in. For example, retrieve all the trace elements generated by optimizer component. (4) Merge trace files. It is a functionality for correlation since diagnosing a problem may need to correlate data from different trace files and merge these data in certain orders (such as timestamp). (5) Convert the trace files into certain format for further viewing, correlating, or navigation. So that users can launch their favorite viewing tools (such as emacs and web browser). (6) List markers—Marker is a special attribute defined in UTS and allows users to mark interesting object state transitions. The UTS of some embodiments provides the functionality to list the information of markers by giving the marker names. (7) Show marked trace elements—since trace elements marked with the same marker represent interesting state transitions, the viewer should have the ability to retrieve all the trace elements with the same marker. (8) Match the first and last trace elements with the same marker ID—markers have the following usage: they can be used to trace the lifetime of an object. This functionality matches the first and last trace elements marked with the same marker to see if the marked objects are still alive at the time of errors.

To summarize, to avoid duplicate efforts by developers of multiple software programs (e.g. in Server Technology), UTS provides a unified interface to read, write, and analyze diagnostic data across all Database components. UTS addresses the needs of all components. Firstly, UTS provides ways to isolate diagnostic data for some components so that they have a deterministic way of controlling how much diagnostic data is available in case exceptions occur. Specifically, UTS prevents data from one component unintentionally overwriting data belonging to another component. To handle this, introduced is the concept of Trace Buckets, which are dedicated trace buffers assigned for a specific purpose. Traces can only be overwritten by traces that belong to the same bucket. The decision as to which set of trace elements to group together into a bucket is totally in the control of developers.

Secondly, UTS provides a write_trace API that is easy to use and self-documenting. A nice benefit to using the API is that, in addition to being easy to use, the format string serves as implicit documentation for the code. Thirdly, the interface for writing traces is flexible. There are no limitations in the size of the message or the number of parameters in the message. Fourthly, it is easy to correlate information in trace files. There are concerns that it is hard to extract diagnostic data written to trace files. Tools that are available are "grep", which is only sometimes useful. The viewer tool is more intelligent, for example supporting "find all redo log dumps for block DBA=1234".

UTS supports proactive tracing—by enabling generation of default traces (i.e. default traces). Such data is crucial in improving the chance of achieving First-failure diagnosis. While it is understood that tracing consumes system resources, UTS provides a very efficient way of in-memory tracing so that the UTS client code can take advantage of proactive tracing as much as possible. An example of default traces is software that tracks a short history of the communications between the coordinators and their slaves.

UTS supports reactive tracing—some traces are by nature too heavy to be ON by default. They will only be turned ON as a reaction to the occurrences of some error conditions. UTS provides support for such traces. Specifically, UTS provides efficient ways for controlling the generation (ON/OFF, Level support) for Reactive traces.

UTS supports targeted control—UTS provides an flexible and efficient control mechanism to allow developers to easily visualize how and when their tracing information is generated. To avoid generating huge volume of unneeded traces, control of tracing information is targeted. For example, users are able to turn ON/OFF tracing for a particular SQL Id or Session id.

UTS supports variable-size payloads. ADR does not impose any low limit on the size of the trace payloads. For example, ADR does not impose any limit on the number of parameters in the API that generate traces.

UTS supports unified API for Tracing Memory and Disk—specifically UTS provides a single API for developers to generate traces, independent of whether the traces are to be written to memory or to disk. The control for memory or disk location is provided at runtime, e.g. by DBAs/Users turning ON or OFF an event. The developers are able to prepare software to write traces without worrying about which type of storage media the trace record is to reside in. For example, the developers do not have to write code like this: If (event(Component_A) Write_bc_Memory(mem_bucket, . . . ); Else Write_bc_Disk(filename, . . . );

UTS provides a timestamp support—(i) The viewer/toolkit must support the ability to correlate traces across multiple ADRs (at least for RAC instances). (ii) The viewer/toolkit must be able to merge trace files that have timestamps in different time zones. (iii) UTS must support clients to (optionally) generate micro-second resolution timestamps in their traces. (iv) UTS must support recording (optionally) a dirtily incremented per-product sequence number. This sequence guarantees ordering traces from a single thread of execution, but it may also help order traces across multiple threads of execution.

In memory tracing by UTS of some embodiments does not impose any performance problems on a relational database management system in which the UTS is implemented. In particular, there is no any heavy penalty in dealing with concurrency issues between threads of execution. To satisfy this requirement, UTS assigns trace buffers individually, to each thread of execution. UTS is implemented to not necessarily achieve the most optimal speed for reading traces, and accordingly UTS supports merging of trace elements from multiple trace files.

UTS also supports dumping of in-memory traces to disk efficiently. Specifically, upon encountering an exception, DDE automatically (without manual intervention) dumps in-memory traces to disk. Dumping of these in-memory buffers does not require extraneous resources, for example, does not require getting locks, or acquiring more SGA memory.

UTS supports viewing of traces in the repository 207 (FIG. 2B). Specifically, a toolkit provides ways for tools to access traces that reside in memory or on disk. For example, UTS implements V$ views for RDBMS users to access the in-memory traces. For on-disk traces, repository 207 provides ways to retrieve diagnostic data using SQL. One embodiment achieves this by supporting the loading of on-disk traces into external tables. UTS also provides the ability to correlate traces by component id, action id (opcode), object id, time range, string search, etc. A repository 207 must also provide easy ways for developers to search for traces from multiple files within the same repository, or even across multiple repositories.

UTS supports hogging prevention—including mechanisms to prevent some components from over-using resources for trace generation. There are two parts: (i) UTS prevents one component from overwriting traces belonging to another component; (ii) UTS prevents runaway components that use up too much memory from the system. For example, UTS imposes a 1% cap of total memory consumed from the system, and perhaps some system-defined percentage on each individual component.

UTS also provides ways for users to identify traces and dumps that are manually generated by users. For example, to identify SQL Trace output belonging to a session, client id, module name, and service name. In addition to the above list, UTS also supports identification by ECID. UTS's ADR also supports maximum on-disk file size and file rollover capability.

In computer 190, UTS requires memory and CPU to operate. The UTS of some embodiments stays within an overall 2% limit on CPU and memory consumption. In actuality, the UTS infrastructure itself does not really consume any resources. It is the instrumentation of proactive traces in code components that consume the resources, and the amount depends on the number of default trace writing instructions that are included in software programs (by their developers). Overall, UTS tracing consumes some amount of CPU and memory resource, but does not exceed 2% limit. Generation of traces by UTS does not impose any performance problems on a database management system (DBMS) in which the UTS is included. In particular, there is no heavy penalty in dealing with concurrency issues of UTS between threads of execution. To satisfy this requirement, a separate trace buffer is assigned by UTS to each thread of execution. UTS provides optimized paths for performance critical components to perform tracing. Some embodiments of UTS maximize proactive tracing in the client code to meet the First Failure diagnosis objectives.

UTS of some embodiments provides support for library based layers that can be executed by more than one software program A . . . I . . . Z. This is the case where the same code executes in a client as well inside of a server. The library code itself is not required to know who the caller is. The UTS infrastructure does not affect the size of client executables (e.g. programs A . . . I . . . Z) with a significant increase in footprint with instrumentation.

The complexity of the UTS design (e.g. memory management) does not cause failure to the client (e.g. RAC/rdbms) code. Finally, UTS does not require any special database configuration. Database configurations, if any, are handled by the underlying ADR layer.

UTS is used to program a computer 190 of the type illustrated in FIGS. 1D and 2B which is discussed next in reference to FIG. 4. Specifically, computer 190 includes a bus 1102 (FIG. 4) or other communication mechanism for communicating information, and a processor 1105 coupled with bus 1102 for processing information. Computer 190 also includes a main memory 1106, such as a random access memory (RAM) or other dynamic storage device, coupled to bus 1102 for storing information and instructions (e.g. traces and software in FIG. 1B and the method of FIG. 3A) to be executed by processor 1105.

Main memory 1106 also may be used for storing temporary variables or other intermediate information (e.g. in-memory traces) during execution of instructions to be executed by processor 1105. Computer 190 further includes a read only memory (ROM) 1104 or other static storage device coupled to bus 1102 for storing static information and instructions for processor 1105. A storage device 1110, such as a magnetic disk or optical disk, is provided and coupled to bus 1102 for storing information and instructions.

Computer 190 may be coupled via bus 1102 to a display device or video monitor 1112 such as a cathode ray tube (CRT) or a liquid crystal display (LCD), for displaying information to a computer user. An input device 1114, including alphanumeric and other keys (e.g. of a keyboard), is coupled to bus 1102 for communicating information and command selections to processor 1105. Another type of user input device is cursor control 1116, such as a mouse, a trackball, or cursor direction keys for communicating direction information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, collecting and analyzing statistics of components in a distributed database system is performed by computer system 190 in response to processor 1105 executing one or more sequences of one or more instructions contained in main memory 1106. Such instructions may be read into main memory 1106 from another computer-readable storage medium, such as storage device 1110. Execution of the sequences of instructions contained in main memory 1106 causes processor 1105 to perform the operations of a process described herein and illustrated in FIG. 3A. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 1105 for execution. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Instead of or in addition to a storage medium, a transmission link may be used to provide instructions to processor 1105. A transmission link includes coaxial cables, copper wire and fiber optics, including the wires that comprise bus 1102. A transmission link can also take the form of acoustic or light waves, such as those generated during radio-wave and infra-red data communications, any of which can be used to implement a carrier wave as described herein.

Accordingly, instructions to processor 1105 can be provided by a transmission link or by a storage medium from which a computer can read information, such as data and/or code. Specifically, various forms of transmission link and/or storage medium may be involved in providing one or more sequences of one or more instructions to processor 1105 for execution. For example, the instructions may initially be comprised in a storage device, such as a magnetic disk, of a remote computer. The remote computer can load the instructions into its dynamic memory (RAM) and send the instructions over a telephone line using a modem. A modem local to computer 190 can receive the information on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer 190 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 200, are exemplary forms of carrier waves transporting the information.

Computer 190 can send messages and receive data, including program code, through the network(s), network link 1120 and communication interface 1115. In the Internet example, a server 1100 might transmit statistics of components in a distributed database system through Internet 1124, ISP 1126, local network 1122 and communication interface 1115.

The instructions for performing the operations of FIG. 3A may be executed by processor 1105 as they are received, and/or stored in storage device 1110, or other non-volatile storage for later execution. In this manner, computer system 200 may obtain the just-described instructions and any related data in the form of a carrier wave.

Note that FIG. 4 is a very low-level representation of many hardware components of a computer system. Several embodiments have one or more additional software components in main memory 1106 as shown in FIG. 1B and/or FIG. 2B. The software components may be, for example, a database server (e.g. available from ORACLE Corporation) that provides access to a database, and a PL/SQL application which changes records in the database via an interface provided a database management system in the server.

Numerous modifications and adaptations of the embodiments described herein will become apparent to the skilled artisan in view of this disclosure.

For example in some embodiments, a UTS of the type described above is used by a diagnostic logic to write structured traces to memory and/or disk as described in US Patent Application Publication 20080126354 by Byron Wang et al entitled "Management of a Distributed Database" that is incorporated by reference herein in its entirety. Also, in some embodiments, trace elements of the type described herein are used to document the occurrence of external and/or internal events in any software (such as an application or an operating system), e.g. in an event log.

Numerous modifications and adaptations of the embodiments described herein are encompassed by the scope of the invention.

What is claimed is:

1. One or more non-transitory computer-readable storage media comprising:
    multiple software programs using common software to cause a computer to store a plurality of structures of diagnostic data, the diagnostic data being generated by execution of the multiple software programs;
    wherein a first software program among the multiple software programs is a portion of an application;
    wherein a second software program among the multiple software programs interfaces with the application;
    wherein the plurality of structures of diagnostic data are organized into hierarchies by structures of a section type, a first structure of the section type comprising a first metadata indicative of a first beginning and a first ending which together identify multiple structures among the plurality of structures of diagnostic data, the multiple structures comprising a second structure of the section type, the second structure comprising second metadata indicative of a second beginning and a second ending which together identify several structures among the multiple structures;
    wherein a structure of a record type in the plurality of structures of diagnostic data comprises an identifier of information comprising a character string indicative of a transition occurring during the execution between portions of each software program, the transition being indicated in the information as being at least entering a function or exiting the function and the structure of the record type further comprises an identifier of a specific software program among the multiple software programs that causes the structure of the record type to be stored; and
    software to use at least the first metadata and the second metadata to display on a video monitor, the plurality of structures of diagnostic data at varying levels of abstraction.

2. The one or more non-transitory computer-readable storage media of claim 1 wherein the structure of the record type further comprises:
    a program-specific attribute comprising a name and a value that are unique to the specific software program; and
    a program-generic attribute comprising an additional name and an additional value, the additional name being stored in common across said multiple software programs and the additional value being different across said multiple software programs.

3. The one or more non-transitory computer-readable storage media of claim 1 further comprising:
    instructions to write third metadata of the structure of the record type, wherein the third metadata is written to a first file different from a second file comprising the information;
    wherein the third metadata is stored compressed in a binary form in the first file and the information is stored uncompressed in a text form in the second file; and
    wherein the third metadata indicates a one-to-one correspondence with the information.

4. The one or more non-transitory computer-readable storage media of claim 1 wherein:
    said plurality of structures comprise one group for each software program;
    at least one structure in each group comprises metadata indicative of a location of a program-specific attribute, said program-specific attribute comprising a name and a value; and
    said program-specific attribute is used only in said each software program and no other software program among said multiple software programs.

5. The one or more non-transitory computer-readable storage media of claim 1 wherein:
    the application is relational database software;
    the first software program among the multiple software programs comprises a database module for compiling an SQL statement; and
    a third software program among the multiple software programs comprises another database module for executing the SQL statement.

6. One or more non-transitory computer-readable storage media comprising:
    multiple software programs using a common grammar to cause a plurality of computers to write to a common storage media, information comprising a plurality of trace elements of diagnostic data for said each software program wherein each trace element is of a type selected from (section type, trace record type, and dump type);

wherein a first software program among the multiple software programs is a portion of an application;

wherein a second software program among the multiple software programs interfaces with said application;

wherein each section type of trace element in said plurality comprises a first metadata indicative of a beginning of a section of said diagnostic data and a second metadata indicative of an end of said section; and wherein a group of trace elements in said plurality are between the beginning of said section of said diagnostic data and the end of said section of said diagnostic data;

wherein the trace record type of trace element in said plurality comprises a character string indicative of a transition occurring during execution of each software program between a plurality of portions of code, the transition being indicated in said character string as being at least entering a function or exiting the function;

wherein the dump type of trace element in said plurality of trace elements comprises a dump header and a dump body, the dump body comprising a set of values of an object, and the dump header comprising an attribute of the object; and wherein said common software comprises:

a first instruction to write at least a first trace element of said section type, said first trace element comprising said first metadata;

a second instruction to write a second trace element of said section type, said second trace element being comprised in said group of trace elements; and a third instruction to write a third trace element of said dump type;

wherein the plurality of trace elements of diagnostic data are organized into hierarchies by trace elements of the section type; and software to display on a video monitor, the plurality of trace elements at varying levels of abstraction.

7. The one or more non-transitory computer-readable storage media of claim 6 wherein:

another trace element within said group of trace elements comprises an additional section within said section of said first trace element.

8. The one or more non-transitory computer-readable storage media of claim 6 wherein:

a portion of code in said each software program corresponds to said section; and at least one of the first metadata and the second metadata comprises an identifier of said portion.

9. The one or more non-transitory computer-readable storage media of claim 6 wherein:

the trace element of the trace record type comprises, in addition to said character string, a first symbol that is used in common by said multiple software programs to identify the trace record type; and the trace element of the dump type comprises, within the dump header, a second symbol that is also used in common by said multiple software programs to identify the dump type.

10. The one or more non-transitory computer-readable storage media of claim 6 wherein:

the information is written to a first file in a predetermined text format; and the first and second metadata is written to a second file in a binary format, with the first metadata identifying said beginning as a first offset within said first file and said second metadata identifying said end as a second offset within said first file.

11. The one or more non-transitory computer-readable storage media of claim 6 wherein:

the information is written in a predetermined text format; and the first and second metadata is written adjacent to said information separated therefrom by at least a predetermined character, the first and second metadata being written in said predetermined text format.

12. The one or more non-transitory computer-readable storage media of claim 6 wherein:

each trace element comprises a plurality of attributes, each attribute comprising a name; and the information being displayed comprises trace elements having a common name for an attribute in the plurality of attributes.

13. The one or more non-transitory computer-readable storage media of claim 12 wherein:

each trace element comprises a value for each attribute;

the common name is for a marker; and the information being displayed comprises trace elements having a common value for said marker.

14. The one or more non-transitory computer-readable storage media of claim 6 wherein:

the plurality of trace elements are written to multiple trace files in the common storage media; and the diagnostic tool merges trace elements from the multiple trace files in a predetermined sequence.

15. The one or more non-transitory computer-readable storage media of claim 6 wherein:

the storage media comprises a plurality of buffers of a fixed size wherein the plurality of trace elements are stored;

the plurality of buffers are grouped into multiple buckets, each bucket comprising a group of buffers;

the storage media further comprising for each bucket, a plurality of sizes including at least a minimum size and a maximum size;

the storage media further comprising instructions to allocate memory to the buckets in one iteration based at least on the minimum size and in another iteration based at least on a difference between memory already allocated and the minimum size and to reduce memory previously allocated to a bucket if the bucket is unused for a specified duration.

16. The one or more non-transitory computer-readable storage media of claim 6 wherein:

a trace element further comprises a plurality of attributes, each attribute comprising a name and a value.

17. The one or more non-transitory computer-readable storage media of claim 16 wherein:

the attribute further comprises a type.

18. The one or more non-transitory computer-readable storage media of claim 16 wherein:

the plurality of attributes comprises a predetermined attribute, a user-defined attribute and a user-implicit attribute;

the predetermined attribute being commonly used by the multiple software programs;

the user-defined attribute being used only by said software program and no other software program in said multiple software programs; and the user-implicit attribute being comprised within information, the user-implicit attribute being expressed in a predetermined notation.

19. The one or more non-transitory computer-readable storage media of claim 16 wherein:
the name of a predetermined attribute is common across said multiple software programs.

20. A computer-implemented method for storing traces of diagnostic data in memory, the memory comprising multiple software programs to perform the method, the method comprising:
writing to a common storage media, by plurality of computers using at least a common grammar, information comprising a plurality of trace elements wherein each trace element is of a type selected from (a section type, a trace record type, or a dump type);
wherein a first software program among the multiple software programs is a portion of an application;
wherein a second software program among the multiple software programs interfaces with said application;
wherein each section type of trace element in said plurality comprises a first metadata indicative of a beginning of a section and a second metadata indicative of an end of said section, with at least one of the first metadata and the second metadata comprising an identifier of each software program corresponding to said section;
wherein a group of trace elements in said plurality are produced on execution by a computer;
wherein the trace record type comprises a first symbol used in common by said multiple software programs to identify the trace record type, the trace record type further comprising information comprising a character string indicative of a transition occurring during execution between regions of code, the transition being indicated in said character string as being at least entering a function or exiting the function;
wherein the dump type comprises a dump header and a dump body, the dump body comprising a set of values of an object, and the dump header comprising a second symbol used in common by each of said multiple software programs to identify the dump type, the dump header further comprising an attribute of the object;
wherein the plurality of trace elements comprise at least a first trace element of said section type, at least a second trace element of said section type included in said group, and at least a third trace element of said dump type also included in said group;
wherein the plurality of trace elements are organized into hierarchies by trace elements of the section type; and
displaying on a video monitor, the plurality of trace elements at varying levels of abstraction.

21. A computer-implemented method comprising:
executing multiple software programs in a computer, each software program using common software causing said computer to store in memory, a plurality of structures of diagnostic data, the diagnostic data being generated during execution of said each software program by said computer;
wherein the plurality of structures of diagnostic data are organized into hierarchies by structures of a section type, a first structure of the section type comprising a first metadata indicative of a first beginning and a first ending which together identify multiple structures among the plurality of structures of diagnostic data, the multiple structures comprising a second structure of the section type, the second structure comprising second metadata indicative of a second beginning and a second ending which together identify several structures among the multiple structures;
wherein a structure of a record type in the plurality of structures of diagnostic data comprises an identifier of information indicative of a transition occurring during said execution between portions of said each software program, and an identifier of a specific software program among the multiple software programs that causes said structure of the record type to be stored; and
using at least the first metadata and the second metadata to display on a video monitor, the plurality of structures of diagnostic data at varying levels of abstraction.

* * * * *

UNITED STATES PATENT AND TRADEMARK OFFICE
CERTIFICATE OF CORRECTION

PATENT NO.        : 8,863,091 B2
APPLICATION NO.   : 12/189080
DATED             : October 14, 2014
INVENTOR(S)       : Dageville et al.

Page 1 of 1

It is certified that error appears in the above-identified patent and that said Letters Patent is hereby corrected as shown below:

In the Specification

In column 14, line 9, delete "meta data." and insert -- metadata. --, therefor.

In column 14, line 22, delete "meta data." and insert -- metadata. --, therefor.

In column 15, line 30, delete "can not" and insert -- cannot --, therefor.

In column 16, line 8, delete "draw back" and insert -- drawback --, therefor.

In column 16, line 24, delete "tha" and insert -- the --, therefor.

In column 18, line 49, delete "can not" and insert -- cannot --, therefor.

In column 20, line 27, delete "can not" and insert -- cannot --, therefor.

In column 20, line 38, delete "can not" and insert -- cannot --, therefor.

In column 24, line 55, delete "trc" and insert -- trc. --, therefor.

In column 27, lines 59-60, delete "user defined" and insert -- user-defined --, therefor.

Signed and Sealed this
Twenty-eighth Day of April, 2015

Michelle K. Lee
*Director of the United States Patent and Trademark Office*